United States Patent
Michels et al.

(10) Patent No.: US 11,499,044 B2
(45) Date of Patent: Nov. 15, 2022

(54) PROCESS FOR PRODUCING ABS GRAFT COPOLYMERS

(71) Applicant: INEOS STYROLUTION GROUP GMBH, Frankfurt am Main (DE)

(72) Inventors: Gisbert Michels, Leverkusen (DE); Ulrich Jansen, Dormagen (DE); Stefan Kaminsky, Neustadt an der Weinstrasse (DE); Nils Wittenberg, Hofheim am Taunus (DE); Fabian Rueter, Neuss (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 348 days.

(21) Appl. No.: 16/607,213

(22) PCT Filed: Apr. 23, 2018

(86) PCT No.: PCT/EP2018/060268
§ 371 (c)(1),
(2) Date: Oct. 22, 2019

(87) PCT Pub. No.: WO2018/197377
PCT Pub. Date: Nov. 1, 2018

(65) Prior Publication Data
US 2020/0377714 A1   Dec. 3, 2020

(30) Foreign Application Priority Data
Apr. 24, 2017 (EP) .................................... 17167771

(51) Int. Cl.
C08L 51/04 (2006.01)
C08F 279/04 (2006.01)
C08C 1/12 (2006.01)

(52) U.S. Cl.
CPC ............... *C08L 51/04* (2013.01); *C08C 1/12* (2013.01); *C08F 279/04* (2013.01); *C08L 2205/02* (2013.01); *C08L 2207/53* (2013.01)

(58) Field of Classification Search
CPC ............ C08L 51/04; C08F 279/04; C08C 1/12
USPC ........................................................ 523/201
See application file for complete search history.

(56) References Cited

U.S. PATENT DOCUMENTS

| | | |
|---|---|---|
| 3,553,167 A | 1/1971 | Schnell et al. |
| 4,009,226 A | 2/1977 | Ott et al. |
| 4,075,173 A | 2/1978 | Maruyama et al. |
| 4,156,069 A | 5/1979 | Prevorsek et al. |
| 4,181,788 A | 1/1980 | Wingler et al. |
| 4,311,823 A | 1/1982 | Imai et al. |
| 4,399,273 A | 8/1983 | Humme et al. |
| 4,772,743 A | 9/1988 | Schmidt et al. |
| 4,982,014 A | 1/1991 | Freitag et al. |
| 5,071,946 A | 12/1991 | Schmidt et al. |
| 5,100,945 A | 3/1992 | Schmidt et al. |
| 5,314,990 A | 5/1994 | Jansen et al. |
| 5,786,445 A | 7/1998 | Wulff et al. |
| 5,910,276 A | 6/1999 | Guntherberg et al. |
| 5,958,316 A | 9/1999 | Guntherberg et al. |
| 5,994,463 A | 11/1999 | Eckel et al. |
| 6,140,426 A | 10/2000 | Sarabi et al. |
| 6,153,692 A | 11/2000 | Liesenfelder et al. |
| 8,299,175 B2 | 10/2012 | Yoo et al. |
| 9,624,333 B2 * | 4/2017 | Niessner .............. C08F 279/02 |
| 9,708,483 B2 | 7/2017 | Niessner et al. |
| 2003/0092836 A1 | 5/2003 | Eichenauer et al. |
| 2003/0225219 A1 | 12/2003 | Eichenauer et al. |
| 2016/0075813 A1 * | 3/2016 | Niessner ................ C08L 55/02 525/78 |
| 2018/0355160 A1 | 12/2018 | Michels et al. |

FOREIGN PATENT DOCUMENTS

| | | |
|---|---|---|
| DE | 1495626 B1 | 6/1971 |
| DE | 2232877 A1 | 1/1974 |
| DE | 2420358 A1 | 12/1975 |
| DE | 2703376 A1 | 8/1977 |
| DE | 2714544 A1 | 10/1977 |
| DE | 2724360 A1 | 12/1978 |
| DE | 3000610 A1 | 7/1980 |
| DE | 2909518 A1 | 9/1980 |
| DE | 3639904 A1 | 6/1988 |
| DE | 3832396 A1 | 2/1990 |
| DE | 3913509 A1 | 10/1990 |
| DE | 4015296 A1 | 11/1991 |
| DE | 19713509 A1 | 10/1998 |
| DE | 10008420 A1 | 8/2001 |
| DE | 102006044270 A1 | 4/2008 |
| EP | 0022200 A1 | 1/1981 |
| EP | 0734825 A1 | 10/1996 |
| EP | 0768157 A1 | 4/1997 |
| EP | 0867463 A1 | 9/1998 |
| EP | 2584001 A1 | 4/2013 |
| EP | 2606073 A1 | 6/2013 |
| GB | 1335353 A | 10/1973 |
| JP | 3390625 B2 | 3/2003 |
| WO | 03099926 A1 | 12/2003 |

(Continued)

OTHER PUBLICATIONS

K. Kirchner, H. Schlapkohl, Makromol. Chem. 177 (1076) 2031-2042, "The Formation of Oligomers in the Thermal Copolymerisation of the Styrene/Acrylonitrile-System".

*Primary Examiner* — Deve V Hall
(74) *Attorney, Agent, or Firm* — Raphael Bellum PLLC; Aaron Raphael

(57) ABSTRACT

The invention relates to a process for producing graft copolymers based on acrylonitrile-butadiene-styrene copolymers (ABS), wherein the graft copolymers may be dewatered particularly readily after production and precipitation and have a low residual moisture content after centrifugation. The invention further relates to a process for producing thermoplastic molding materials using the thus obtained ABS graft copolymers.

12 Claims, 1 Drawing Sheet

(56) References Cited

FOREIGN PATENT DOCUMENTS

| WO | 2008020012 | A2 | 2/2008 |
| WO | 2012022710 | A1 | 2/2012 |
| WO | 2014170406 | A1 | 10/2014 |
| WO | 2014170407 | A1 | 10/2014 |
| WO | 2017093468 | A1 | 6/2017 |

* cited by examiner

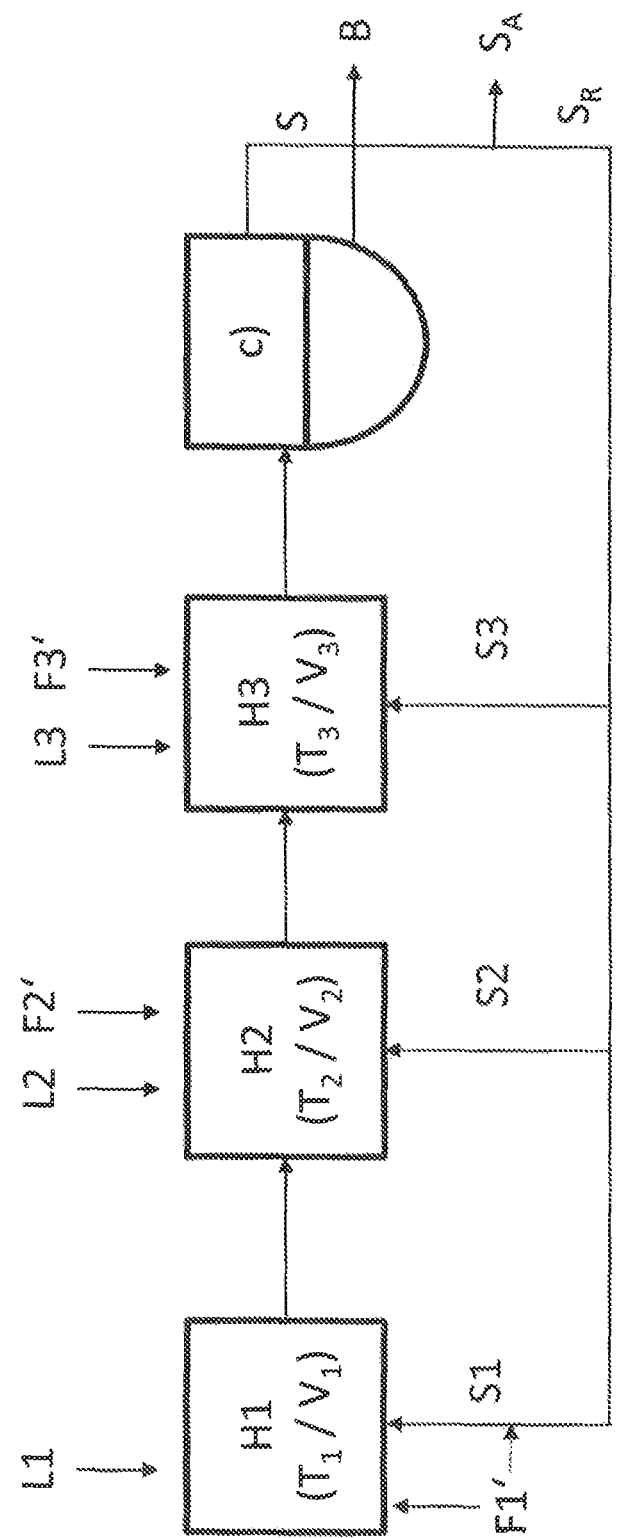

PROCESS FOR PRODUCING ABS GRAFT COPOLYMERS

The invention relates to a process for the production of graft copolymers based on acrylonitrile-butadiene-styrene copolymers (ABS), in which the graft copolymers can be dewatered particularly successfully after production and precipitation and then have a low residual moisture content after centrifuging. The invention further relates to a process for the production of thermoplastic molding compositions with use of the resultant ABS graft copolymers.

Large quantities of acrylonitrile-butadiene-styrene copolymers (ABS) and acrylonitrile-butadiene-methylstyrene copolymers have been used for many years in the form of thermoplastic molding compositions for the production of moldings of all types. It is known that the impact resistance of styrene-acyrlonitrile copolymers (SAN) or methylstyrene-acrylonitrile copolymers (AMSAN) can be improved by incorporating graft rubber, for example grafted polybutadiene rubbers. These impact-modified SAN molding compositions can in principle be produced by graft polymerization of styrene and acrylonitrile in the presence of a polybutadiene rubber and/or by subsequent blending of a graft copolymer with a separately produced polymeric SAN matrix. It is possible here to achieve great variation in the properties of the molding compositions and of the moldings produced therefrom.

ABS molding compositions in particular feature advantageous mechanical properties, for example high toughness (impact resistance, notched impact resistance), high elasticity (modulus of elasticity), good processability (thermoplastic flowability, MVR), and high heat resistance, and moreover often have good surface properties, for example gloss, smoothness, homogeneity, uniform appearance.

ABS graft copolymers are mostly produced by emulsion polymerization; the SAN matrix is often produced by bulk polymerization or solution polymerization. Production of ABS graft copolymers is generally based on one or more polybutadiene latices via graft copolymerization of styrene and/or acrylonitrile. In a conventional method frequently adopted, the average particle size of the polybutadiene latex (based on a polybutadiene seed latex) is adjusted in controlled manner by agglomeration before the graft polymerization, since the size of the latex particles substantially influences the physical properties of the subsequent thermoplastic molding compositions.

This agglomeration can be achieved by way of example by treatment of the polybutadiene latex with a salt solution or a salt/acid solution, or specific agglomerating copolymers (e.g. WO 2014/170407, EP-A 0 022 200).

The graft copolymers, initially obtained in latex form, are typically precipitated by salt solutions and/or acid solutions, and isolated from the aqueous solution (also termed serum or mother liquor). This can generally be achieved by filtration or centrifuging. The extracted serum is frequently returned to the precipitation procedure. The precipitated latices, the residual moisture content of which is about 15 to 40% by weight, are typically dried to residual moisture content below 2% by weight in a downstream drying step, e.g. in a fluidized-bed dryer or pneumatic dryer. The dried graft copolymers are then compounded in extruders or other screw-based machines with styreneacrylonitrile copolymers, extruded, and finally obtained in pellet form. In a conventional method frequently used, the graft copolymer is washed in one or more steps after graft polymerization and precipitation, in order to reduce the quantity of salts and other impurities in the product.

For economic reasons, and in order to save drying energy, and also in order to reduce the quantity of entrained impurities, for example salts, it is desirable to obtain precipitated latices with good dewatering properties, and thus to obtain polymer products (filter cakes) with minimized residual moisture level.

EP-A 0 734 825 describes the dewatering and drying of an ABS graft copolymer in an extruder.

DE-A 656 780 describes a process for the coagulation of rubber latices, where small quantities of inorganic or organic acids are mixed at pH from 2 to 4 with the rubber latices in a first precipitation container, with stirring, and the polymer product is aged in at least one further container. However, when this process is used in the work-up of ABS graft rubber polymers it leads to very fine powder suspensions with poor filterability and high residual moisture level in the moist powder product.

DE-A 4 0152 96 describes a continuous process for the work-up of vinyl polymer latices with return of the serum from mechanical dewatering (e.g. centrifuging) to the mixing stage involving precipitation solution and latex, in order to reclaim auxiliaries used (salt and acid) and to reduce the quantity of wastewater. Products with comparatively high residual moisture content are obtained.

U.S. Pat. No. 8,299,175 describes a production process for ABS in which the graft rubber latex is first precipitated at from 60 to 80° C. and then is aged at from 80 to 99° C.

DE-A 10 2006 044 270 and DE-A 2 909 518 describe processes for the work-up of graft polymer latices. However, these processes have the disadvantage that the residual moisture contents of the water-moist graft rubber polymers are comparatively high after extraction of the aqueous solution.

Dewatering and drying of the graft copolymer thus generally incur high energy cost and high apparatus cost. There is therefore a need to provide a simple and inexpensive production process for ABS graft copolymers where the graft copolymers can be obtained in a simple and inexpensive manner with low drying cost, for example in the form of a dried powder. The thermoplastic molding compositions produced with the aid of the graft copolymers should moreover have good mechanical properties, and also good surface quality.

It was therefore an object of the invention to provide a process for the production of an ABS graft copolymer which, in comparison with processes of the prior art, reduces the residual moisture content of the filter cake, i.e. of the water-moist ABS graft copolymers, after centrifuging.

Surprisingly, it has been found that ABS graft copolymers with particularly advantageous dewatering behavior are obtained when mixing of graft copolymer latex and precipitation solution first takes place in a first relatively small precipitation container with a short residence time and then the precipitation is continued in further larger containers with longer residence time. In particular, the volume of the first precipitation container is at most 30% by of the volume of the subsequent precipitation container. It has proven particularly advantageous to begin by mixing graft copolymer latex and precipitation solution in a flow tube. It has moreover been found that temperatures in the range from 30 to 80° C., preferably from 35 to 75° C., in the first precipitation container, and a temperature higher than this in the second precipitation container, e.g. in the range from 60 to 130° C., preferably from 82 to 98° C., lead to graft copolymer dispersions with significantly improved dewatering properties.

The invention provides a process for the production of a graft copolymer composition comprising:

B: from 90 to 100% by weight, preferably from 95 to 100% by weight, particularly preferably from 99 to 100% by weight, frequently from 95 to 99.9% by weight, of at least one graft copolymer B comprising:
  B1: from 40 to 85% by weight, preferably from 50 to 80% by weight, particularly preferably from 55 to 70% by weight, based on the graft copolymer B, of at least one graft base B1 which is obtained via emulsion polymerization of:
    B11: from 50 to 100% by weight, preferably from 80 to 100% by weight, particularly preferably from 90 to 100% by weight, based on the graft base B1, of butadiene,
    B12: from 0 to 50% by weight, preferably from 0 to 20% by weight, particularly preferably from 0 to 10% by weight, based on the graft base B1, of at least one other monomer B12 selected from styrene, α-methylstyrene, acrylonitrile, methacrylonitrile, isoprene, chloroprene, $C_1$-$C_4$-alkylstyrene, $C_1$-$C_8$-alkyl (meth)acrylate, alkylene glycol di(meth)acrylate and divinylbenzene;
    where the entirety of B11+B12 provides precisely 100% by weight; and
  B2: from 15 to 60% by weight, preferably from 20 to 50% by weight, particularly preferably from 30 to 45% by weight, based on the graft copolymer B, of a graft shell B2 which is obtained via emulsion polymerization, in the presence of the at least one graft base B1, of:
    B21 from 50 to 95% by weight, preferably from 65 to 80% by weight, particularly preferably from 75 to 80% by weight, based on the graft shell B2, of a monomer B21 selected from styrene and mixtures of styrene with at least one other monomer selected from α-methylstyrene, p-methylstyrene and $C_1$-$C_8$-alkyl (meth)acrylate (e.g. methyl methacrylate, ethyl methacrylate, n-butyl acrylate, tert-butyl acrylate);
    B22 from 5 to 50% by weight, preferably from 20 to 35% by weight, particularly preferably from 20 to 25% by weight, based on the graft shell B2, of a monomer B22 selected from acrylonitrile and mixtures of acrylonitrile with at least one other monomer selected from methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide);
    where the entirety of graft base B1 and graft shell B2 provides precisely 100% by weight; and
K1: from 0 to 10% by weight, preferably from 0 to 5% by weight, particularly preferably from 0 to 1% by weight, frequently from 0.1 to 5% by weight, of at least one other component K1,
comprising the steps of:
a) production of the graft copolymer B comprising emulsion polymerization of the graft shell B2 in the presence of the at least one graft base B1, where the graft copolymer B is obtained in the form of a latex L;
b) precipitation of the latex L of the at least one graft copolymer B after emulsion polymerization, preferably in a continuous step, via addition of at least one precipitation solution F comprising at least one salt and/or at least one acid, where a precipitation solution F1 and a portion of the latex L1 are mixed in a first container H1 at a temperature $T_1$ in the range from 30 to 80° C., preferably from 35 to 75° C., particularly preferably from 40 to 70° C., with particular preference from 40 to 60° C., and the mixture of latex L1 and precipitation solution F1 is passed into at least two further containers H2 and H3 with temperatures $T_2$ and $T_3$ in the range from 60 to 130° C., preferably from 82 to 98° C., particularly preferably from 60 to 90° C., where optionally further portions of the latex L2 and/or L3 and optionally further precipitation solutions F2 and/or F3 are added,
where the volume $V_1$ of the first container H1 is less than or equal to 30%, preferably less than or equal to 10%, particularly preferably less than or equal to 5%, of the volume $V_2$ of the second container H2;
c) mechanical dewatering of the precipitated graft copolymer B from step b), preferably by means of centrifuging and/or filtration, where an extracted serum S and a graft copolymer B are obtained, where the residual moisture content of the graft copolymer B is less than or equal to 25% by weight;
d) optionally drying of the dewatered graft copolymer B from step c).

In a preferred embodiment, the ABS graft copolymer composition is obtained in the form of a powder, i.e. the dewatered graft copolymer B from step c) is dried without addition of other polymeric components. In this preferred embodiment, step d) of the process comprises the drying of the dewatered graft copolymer B from step c), where a graft copolymer powder is obtained with residual moisture content less than or equal to 5% by weight.

It is moreover possible to mix the dewatered graft copolymer B from step c) with a thermoplastic copolymer A in the melt and to dry the materials together in an extruder or compounding device.

Step a) and components B and K1

The at least one graft copolymer B is produced from (or consists of):
  from 40 to 85% by weight, preferably from 50 to 80% by weight, particularly preferably from 55 to 70% by weight, based on the graft copolymer B, of at least one graft base B1, preferably a polybutadiene latex,
  and from 15 to 60% by weight, preferably from 20 to 50% by weight, particularly preferably from 30 to 45% by weight, based on the graft copolymer B, of a graft shell B2 which is obtained via emulsion polymerization of the monomers B21, preferably styrene and/or α-methylstyrene, and B22, preferably acrylonitrile, in the presence of the at least one graft base B1,
  where the entirety of graft base B1 and graft shell B2 provides precisely 100% by weight.

In a preferred embodiment, the at least one graft base B1 is obtained via emulsion polymerization of:
  B11: from 50 to 100% by weight, preferably from 80 to 100% by weight, based on the graft base B1, of butadiene,
  B12: from 0 to 50% by weight, preferably from 0 to 20% by weight, particularly preferably from 0 to 10% by weight, based on the graft base B1, of at least one other monomer B12 selected from styrene and acrylonitrile;
  where the entirety of B11+B12 provides precisely 100% by weight.

In a preferred embodiment, the graft base B1 is a pure polybutadiene latex. In another preferred embodiment, the at least one graft base B1 is obtained via emulsion polymerization of:

B11: from 50 to 99% by weight, preferably from 80 to 95% by weight, based on the graft base B1, of butadiene, B12: from 1 to 50% by weight, preferably from 5 to 20% by weight, particularly preferably from 5 to 10% by weight, based on the graft base B1, of at least one other monomer B12 selected from styrene and acrylonitrile;

where the entirety of B11+B12 provides precisely 100% by weight.

It is preferable that the monomer B21 is styrene or a mixture of styrene with at least one other monomer selected from α-methylstyrene, methyl methacrylate, ethyl methacrylate, n-butyl acrylate and tert-butyl acrylate, particularly preferably is styrene or a mixture of styrene with at least one other monomer selected from α-methylstyrene and methyl methacrylate.

It is preferable that the monomer B22 is acrylonitrile or a mixture of acrylonitrile with at least one other monomer selected from methacrylonitrile, maleic anhydride, N-cyclohexylmaleimide and N-phenylmaleimide, particularly preferably is acrylonitrile or a mixture of acrylonitrile with at least one other monomer selected from methacrylonitrile and maleic anhydride.

In a particularly preferred embodiment, the monomer B21 is styrene and the monomer B22 is acrylonitrile.

The monomers used in the emulsion graft polymerization of the graft copolymer B are preferably mixtures of styrene and acrylonitrile in a ratio by weight of from 95:5 to 50:50, particularly preferably in a ratio by weight of from 80:20 to 65:35.

In a preferred embodiment, the average particle diameter $D_{50}$ of the graft base B1 is in the range from 100 to 1000 nm.

In a preferred embodiment, the gel content of the graft base B1 is in the range from 30 to 95% by weight.

The average particle diameter $d_{50}$ is typically determined by ultracentrifuge measurement as described by way of example in W. Scholtan, H. Lange (Kolloid Z. u. Z. Polymere 250, pp. 782 to 796 (1972)). The gel content values stated relate to determination by the wire cage method in toluene, as described by way of example in Houben-Weyl (Methoden der Organischen Chemie, Makromolekulare Stoffe, Teil 1 [Methods of organic chemistry, Macromolecular substances, Part 1], p. 307 (1961), Thieme Verlag Stuttgart).

Gel contents of the at least one graft base B1 (polybutadiene latices), in particular of the various graft bases B1-A, B1-B, B1-C and B1-D, as described below, can typically in principle be adjusted in a known manner via use of suitable reaction conditions. By way of example, a high reaction temperature and/or conduct of the polymerization to high conversion, and also optionally addition of crosslinking substances, usually lead to high gel content. By way of example, low reaction temperature and/or termination of the polymerization before onset of any major crosslinking, and also optionally addition of molecular-weight regulators (for example n-dodecyl mercaptan or tert-dodecyl mercaptan) usually lead to low gel content.

It is preferable that the at least one graft base B1, in particular the various graft bases B1-A, B1-B, B1-C and B1-D as described below, is produced via emulsion polymerization of butadiene as monomer B11 by what is known as the seed polymerization method. This typically begins by producing a fine-particle latex, preferably a polybutadiene latex, as seed latex, and then continues polymerization via addition of further monomers comprising or consisting of butadiene, to give larger latex particles. This is described by way of example in Houben-Weyl (Methoden der Organischen Chemie, Makromolekulare Stoffe, Teil 1 [Methods of organic chemistry, Macromolecular substances, Part 1], p. 339 (1961), Thieme Verlag Stuttgart). A seed-batch process can preferably be used here, or a seed-feed process.

Seed latices used are preferably butadiene polymers, e.g. polybutadiene, butadiene/styrene copolymers or butadiene/acrylonitrile copolymers. In principle it is also possible to use other fine-particle latices comprising or consisting of the monomers B12; by way of example, it is possible to use seed latices made of polystyrene or of styrene copolymers, polymethyl methacrylate or methyl methacrylate copolymers. It is preferable to use pure polybutadiene latices as seed latices in the production of the graft base B1, and in particular in the production of the graft bases B1-A, B1-B, B1-C and B1-D.

In a preferred embodiment, the process of the invention comprises the production of at least two different graft copolymers B from at least two different graft bases B1, where the graft bases B1 differ via their average particle diameter $d_{50}$. It is preferable to use one or more of the graft bases B1-A, B1-B, B1-C and B1-D described below.

It is preferable to use a graft copolymer B-I as graft copolymer B, where graft copolymer B-1 is obtained via emulsion polymerization of a mixture of the monomers B21 and B22 in the presence of a graft base B1-A, the average particle diameter $D_{50}$ of which is in the range from 230 to 330 nm, preferably from 240 to 320 nm, particularly preferably from 250 to 310 nm, and of a graft base B1-B, the average particle diameter $D_{50}$ of which is in the range from 340 to 480 nm, preferably from 350 to 470 nm, particularly preferably from 360 to 460 nm.

In a preferred embodiment, a mixture of two or more graft copolymers B-I is used as graft copolymer B, where the graft copolymers B-I differ in the nature of the initiator in the production of the graft shell B2 and/or in the proportion of the monomers B21 and B22 in the graft shell.

It is preferable that a mixture of the graft copolymers B-I-a and B-I-b is used as graft copolymer B, where graft copolymer B-I-a comprises a graft shell B2 obtained via emulsion polymerization of the monomers B21 and B22 in the presence of the at least one graft base B1, in particular of the graft bases B1-A and B1-B, with use of at least one organic and/or inorganic peroxide compound as initiator, preferably with use of an inorganic peroxide salt, in particular of an inorganic peroxodisulfate salt, for example sodium peroxodisulfate and/or potassium peroxodisulfate, as initiator; and where the graft copolymer B-I-b comprises a graft shell B2 obtained via emulsion polymerization of the monomers B21 and B22 in the presence of the at least one graft base B1, in particular of the graft bases B1-A and B1-B, with use of a redox initiator comprising at least one organic hydroperoxide; at least one reducing agent selected from glucose, sucrose, ascorbic acid and sodium ascorbate, and also optionally transition metal salts, e.g. iron(II) sulfate, particularly preferably with use of a redox initiator consisting of at least one organic hydroperoxide selected from cumene hydroperoxide, tert-butyl hydroperoxide and p-menthane hydroperoxide and of at least one reducing agent selected from glucose, sucrose, ascorbic acid and sodium ascorbate.

In another preferred embodiment, the graft copolymer B is a mixture of at least two, preferably precisely two, graft copolymers B-I and B-II, where graft copolymer B-I is obtained as described above, and graft copolymer B-II is obtained via emulsion polymerization of a mixture of the monomers B21 and B22 in the presence of a graft base B1-C, the average particle diameter $D_{50}$ of which is in the range from 10 to 220 nm, preferably from 20 to 210 nm, particularly preferably from 30 to 200 nm.

It is preferable that the graft bases B1-A, B1-B, B1-C and/or B1-D, preferably the graft bases B1-A and B1-B, are produced with use of a seed latex with average particle diameter $D_{50}$ in the range from 10 to 220 nm, preferably from 20 to 210 nm and particularly preferably from 30 to 200 nm. If the seed latices with average particle diameters $D_{50}$ above 80 nm, preferably above 90 nm and particularly preferably above 100 nm are used, it is preferable that the seed latices themselves are also produced by seed polymerization. For this, it is preferable to use seed latices (B1-D) with average particle diameter $D_{50}$ in the range from 10 to 60 nm, preferably from 20 to 50 nm. It is preferable to produce the graft base B1-C with use of a seed latex B1-D with average particle diameter $D_{50}$ in the range from 10 to 60 nm, preferably from 20 to 50 nm.

In a preferred embodiment, the graft copolymer B-I is obtained via emulsion polymerization in the presence of graft bases B1-A and/or B1-B, where the graft bases B1-A and/or B1-B are produced with use of the graft base B1-C as seed latex. In a preferred embodiment, the graft copolymer B-II is obtained via emulsion polymerization in the presence of the graft base B1-C, where B1-C serves as seed latex for the production of the graft bases B1-A and/or B1-B.

The ratio by weight of the solids of the graft bases B1-A and B1-B during the emulsion polymerization of the graft copolymer B-I can be varied widely. The ratio by weight of the solids of B1-A to those of B1-B is typically in the range from 90:10 to 10:90, preferably from 80:20 to 20:80, particularly preferably from 70:30 to 30:70 and very particularly preferably from 60:40 to 40:60. The solids of the graft bases B1 (butadiene latices) are typically determined gravimetrically by drying at 180° C. for 23 minutes in a convection drying oven, or by means of a drying and weighing device.

The average particle diameter $D_{50}$ of the graft base B1-A is preferably in the range from 230 to 330 nm, preferably from 240 to 320 nm and particularly preferably from 250 to 310 nm, its gel content being in the range from 30 to 80% by weight, preferably from 40 to 75% by weight and particularly preferably from 45 to 70% by weight.

The average particle diameter $D_{50}$ of the graft base B1-B is preferably in the range from 340 to 480 nm, preferably from 350 to 470 nm and particularly preferably from 360 to 460 nm, its gel content being in the range from 50 to 95% by weight, preferably from 55 to 90% by weight and particularly preferably from 60 to 85% by weight.

The average particle diameter $D_{50}$ of the graft base B1-C is preferably in the range from 10 to 220 nm, preferably from 20 to 210 nm and particularly preferably from 30 to 200 nm, its gel content being in the range from 30 to 98% by weight, preferably from 40 to 95% by weight and particularly preferably from 50 to 92% by weight.

The seed latex B1-D is preferably a pure polybutadiene latex. The average particle diameter $D_{50}$ of B1-D is preferably in the range from 10 to 60 nm, preferably from 20 to 50 nm, its gel content being in the range from 10 to 95% by weight, preferably from 20 to 90% by weight and particularly preferably from 30 to 85% by weight.

It is additionally possible to use molecular weight regulators during production of the graft base B1 and/or during emulsion polymerization of the at least one graft copolymer B, quantities of these being preferably from 0.01 to 2% by weight, particularly preferably from 0.05 to 1% by weight (based in each case on the entire quantity of monomer in the emulsion polymerization). Examples of suitable molecular weight regulators are alkyl mercaptans, for example n-dodecyl mercaptan, tert-dodecyl mercaptan; dimeric α-methylstyrene and terpinols.

Initiators used during the production of the graft base B1 and/or during the emulsion polymerization of the at least one graft copolymer B can be any desired initiators which decompose with formation of free radicals at the desired reaction temperature. It is typically possible to use initiators which decompose solely by a thermal route, or those that decompose in the presence of a redox system. It is preferable to use, as initiator, at least one organic and/or inorganic peroxide compound (comprising at least one peroxide group R—O—O—H and/or R—O—O—R), e.g. hydrogen peroxide, cumene hydroperoxide, tert-butyl hydroperoxide, p-menthane hydroperoxide, ammonium persulfate, potassium persulfate or sodium persulfate. In particular, inorganic peroxide salts are used, examples being peroxodisulfates (persulfates), perphosphates and perborates of ammonium, sodium or potassium. Particular preference is given to use, as initiators, of sodium persulfates or potassium persulfates and/or of organic hydroperoxides, for example cumene hydroperoxide and tert-butyl hydroperoxide.

Redox initiators typically used are organic hydroperoxides, reducing agents, and also optionally transition metal salts, e.g. iron(II) sulfate. Reducing agents that can be used are by way of example glucose, sucrose, ascorbic acid, sodium ascorbate.

In a preferred embodiment, an inorganic peroxide salt, in particular an inorganic peroxodisulfate salt, preferably sodium peroxodisulfate and/or potassium peroxodisulfate, is used in the emulsion polymerization of the graft copolymer B.

In another preferred embodiment, a redox initiator comprising, but preferably consisting of, tert-butyl hydroperoxide and sodium ascorbate is used in the emulsion polymerization of the graft copolymer B.

Customary anionic emulsifiers can typically be used as emulsifier in the production of the graft base B1 and/or in the emulsion polymerization for the production of the at least one graft copolymer B. Preferred emulsifiers are alkyl sulfates, alkylsulfonates, aralkyl sulfates, soaps of saturated or unsaturated fatty acids, and also of alkaline disproportionated or hydrogenated abietic or tall oil acids or a mixture thereof. It is preferable to use emulsifiers having carboxy groups (e.g. disproportionated abietic acid, salts of $C_{10}$-$C_{18}$-fatty acids, emulsifiers as in DE-A 36 39 904 and DE-A 39 13 509).

In another preferred embodiment, it is possible to use, as emulsifiers, alkaline soaps of the sodium and potassium salts of disproportionated and/or dehydrogenated and/or hydrogenated and/or partially hydrogenated resins (colophony) with at least 30% by weight content of dehydroabietic acid and with at most 1% content of abietic acid.

It is moreover possible to use salts, acids and bases as component K1 during the emulsion polymerization of the graft base B1, e.g. sulfuric acid, phosphoric acid, solutions of sodium hydroxide, of potassium hydroxide, and of sulfates and phosphates of sodium and of potassium; tetrasodium pyrophosphate can in particular be used.

The polymerization temperature during the emulsion polymerization of the graft copolymer B is generally from 25 to 160° C., preferably from 40 to 90° C. Suitable emulsifiers have been mentioned above. Conventional temperature control, e.g. isothermal, can be used here. However, the graft polymerization procedure is preferably such that the temperature difference between start and end of the reaction is at least 10° C., preferably at least 15° C. and particularly preferably at least 20° C.

The graft copolymer B, in particular the graft copolymers B-I and B-II, is/are produced in the invention by means of emulsion polymerization. The person skilled in the art is aware of familiar embodiments of emulsion polymerization, operating batchwise or continuously.

In particular, the monomers of the graft shell B2, i.e. monomers B21 and B22, are added separately or in the form of monomer mixture continuously to the graft base B2 in the quantities and ratios mentioned, and polymerized. The monomers here are typically added to the graft base B1 in a manner known to the person skilled in the art.

In the production of the graft copolymer B-I, the monomers of the graft shell B2, i.e. the monomers B21 and B22, are added continuously, separately or in the form of monomer mixture, to a mixture of the graft bases B1-A and B1-B, and polymerized.

In the production of the graft copolymer B-II, the monomers of the graft shell B2, i.e. the monomers B21 and B22, are added continuously, separately or in the form of monomer mixture, to the graft base B1-C, and polymerized.

The monomer feed procedure during the emulsion polymerization to produce the graft copolymer B can preferably be such that from 55 to 90% by weight, preferably from 60 to 80% by weight and particularly preferably from 65 to 75% by weight, of the entire quantity of monomers used in the emulsion polymerization, in particular of the monomers B21 and B22, are added within the first half of the total metering time of the monomers, while the remaining proportion of the monomers is added within the second half of the total metering time.

In a preferred embodiment, a graft copolymer B-III, as described in WO 2012/022710, can be used as graft copolymer B.

The graft copolymers described in WO 2012/022710 are in particular produced via emulsion polymerization of the monomers B21 and B22, in particular styrene and acrylonitrile, in a ratio by weight of from 95:5 to 50:50 in the presence of at least one graft base B1-E (e.g. agglomerated polybutadiene latices A11, A12, A13, A51, A52, A53, A54, A61 and A62 as in WO 2012/022710), where the average particle diameter $D_{50}$ of the graft base B1-E is from 200 to 800 nm, preferably from 225 to 650 nm and particularly preferably from 250 to 600 nm.

The graft base B1-E is typically obtained via agglomeration of fine-particle polybutadiene seed latices (e.g. fine-particle polybutadiene latices B1 and B6 as in WO 2012/022710) with acetic anhydride as in WO 2012/022710. The average particle diameter $D_{50}$ of the fine-particle polybutadiene seed latices is typically below 110 nm. They are mostly produced via emulsion polymerization of butadiene where up to 50% by weight of butadiene, based on the total quantity of the monomers, can be replaced by one or more monomers copolymerizable with butadiene. Examples of these are: isoprene, chloroprene, acrylonitrile, styrene, alpha-methylstyrene, $C_1$-$C_4$-alkylstyrenes, $C_1$-$C_8$-alkyl acrylates, $C_1$-$C_8$-alkyl methacrylates. The quantity of acetic anhydride to be used in this embodiment is preferably from 0.1 to 5 parts, based on 100 parts of the solid of the fine-particle polybutadiene seed latex. The fine-particle polybutadiene seed latex is preferably mixed with acetic anhydride and, after agglomeration has been completed, stabilized with a basic solution, preferably a solution of potassium hydroxide. Further details concerning the agglomeration can be found in WO 2012/022710. Emulsifiers, initiators and molecular weight regulators, bases, acids and salts can be used as described above and as described in WO 2012/022710.

The agglomerated polybutadiene seed latex (graft base B1-E) is grafted with styrene and acrylonitrile; it is preferable here to polymerize from 15 to 60% by weight of a mixture of styrene and acrylonitrile and optionally of other monomers in the presence of from 40 to 85% by weight of the graft base B1-E (calculated as latex solid).

Up to 50% by weight, based on the entirety of the monomers used in the grafting procedure, can be replaced by other monomers such as alpha-methylstyrene, methyl methacrylate, maleic anhydride and N-phenylmaleimide. Further details concerning grafting of the graft base B1-E can be found in WO 2012/022710.

In another preferred embodiment (graft copolymer B-IV) of the invention, the graft copolymer B is obtained via emulsion polymerization of the monomers B21 and B22, in particular styrene and acrylonitrile, in a ratio by weight of from 95:5 to 50:50 in the presence of at least one graft base B1-F, where the graft base B1-F is a polybutadiene latex with average particle diameter $D_{50}$ from 150 to 400 nm, preferably from 150 to 350 nm and particularly preferably from 150 to 300 nm, and optionally of another graft base B1-G, where the graft base B1-G is a polybutadiene latex with average particle diameter $D_{50}$ from 425 to 700 nm, preferably from 450 to 650 nm and particularly preferably from 450 to 600 nm, where the polybutadiene latices B1-F and B1-G are obtained via agglomeration of fine-particle polybutadiene latices with acetic anhydride.

In a preferred embodiment, a graft copolymer B-IV is used of which the glass transition temperature $T_g$ is <0° C., preferably <−20° C., particularly preferably <−40° C. The glass transition temperature $T_g$ is typically measured by dynamic mechanical analysis (DMA), using a frequency of 1 Hz.

The preferred graft copolymer B-IV is composed of
from 40 to 85% by weight, preferably from 45 to 85% by weight, particularly preferably from 45 to 75% by weight, based on the entire graft copolymer B-IV, of at least one graft base B1-F, and optionally of a graft base B1-G, produced from:
from 80 to 98% by weight, preferably from 85 to 97% by weight, based on B1-F and B1-G, of butadiene (monomer B11), preferably 1,3-butadiene, and
from 2 to 20% by weight, preferably from 3 to 15% by weight, based on B1-F and B1-G, of at least one other monomer B12, preferably styrene, and
from 15 to 60% by weight, preferably from 15 to 55% by weight, particularly preferably from 25 to 55% by weight, based on the entire graft copolymer B-IV, of at least one graft shell B2 which is obtained via emulsion polymerization, in the presence of the graft base B1-F and optionally, B1-G of:
from 65 to 80% by weight, in particular from 65 to 75% by weight, based on the graft shell B2, of at least one monomer B21, in particular styrene, and from 20 to 35% by weight, in particular from 25 to 35% by weight, based on the graft shell B2, of at least one monomer B22, in particular acrylonitrile and/or methacrylonitrile, preferably acrylonitrile.

The graft copolymer B-IV is particularly preferably composed of:
from 45 to 85% by weight, particularly preferably from 45 to 75% by weight, based on the entire graft copolymer B-IV, of the graft bases B1-F and B1-G, produced from:

from 80 to 98% by weight, preferably from 85 to 97% by weight, based on B1-F and B1-G, of 1,3-butadiene (monomer B11), and from 2 to 20% by weight, preferably from 3 to 15% by weight, based on B1-F and B1-G, of styrene (monomer B12); and from 15 to 55% by weight, particularly preferably from 25 to 55% by weight, based on the entire graft copolymer B-IV, of at least one graft shell B2 which is obtained via emulsion polymerization, in the presence of the graft bases B1-F and B1-G, of:

from 65 to 80% by weight, in particular from 65 to 75% by weight, based on the graft shell B2, of styrene (monomer B21) and from 20 to 35% by weight, in particular from 25 to 35% by weight, based on the graft shell B2, of acrylonitrile (monomer B22).

The graft copolymers B-IV can have mono-, bi-, tri- or multimodal particle size distribution. Bi, tri- or multimodal particle size distribution can be achieved by way of example via (partial) agglomeration of the fine-particle polybutadiene seed latices. It is preferable to use a graft copolymer B-IV which has bimodal particle size distribution and which is produced via emulsion polymerization (grafting) in the presence of a mixture of an agglomerated polybutadiene latex B1-F with particle size from 150 to 300 nm with an agglomerated polybutadiene latex B1-G with particle size from 450 to 600 nm. The mixing ratio of the graft bases B1-F and B1-G is preferably from 50/50 to 90/10.

In another preferred embodiment, a graft copolymer B-V, as described in WO 2014/170407, can be used as graft copolymer B. It is preferably possible to use a graft copolymer B-V obtained via emulsion polymerization of the monomers B21 and B22 in the presence of at least one graft base B1-H (e.g. agglomerated graft base B1-1, pages 30 and 31 of WO 2014/170407), where this is a polybutadiene latex which has bimodal particle size distribution and which comprises a fraction of non-agglomerated latex particles with average particle diameter $D_{50}$ in the range from 80 to 120 nm and a fraction of agglomerated latex particles with average particle diameter $D_{50}$ in the range from 350 to 550 nm.

The graft base B1-H is typically obtained via agglomeration of fine-particle polybutadiene seed latices (e.g. graft base B1, page 27 of WO 2014/170407) with an agglomerating acrylate copolymer (e.g. copolymer C-1, page 28 of WO 2014/170407).

The average particle diameter $D_{50}$ of the fine-particle polybutadiene seed latices is typically in the range from 80 to 120 nm, said latices being produced by emulsion polymerization of butadiene where up to 10% by weight of butadiene, based on the total quantity of the monomers, can have been replaced by a vinylaromatic, e.g. styrene, alpha-methylstyrene, $C_1$-$C_4$-alkylstyrenes. In this embodiment, styrene and acrylonitrile are used for grafting of the graft base B1-H (agglomerated graft base B1 as in WO 2014/170407), preference being given to polymerization of from 15 to 60% by weight of a mixture of styrene and acrylonitrile, optionally with other monomers, in the presence of from 40 to 85% of the graft base B1-H (calculated as solid of the latex).

Details concerning the agglomerating copolymer and concerning production of the graft copolymer based on the graft base B1-H can be found in WO 2014/170407 (in particular production process of page 31 of WO 2014/170407).

The graft copolymer B of the invention can in principle comprise, as optional component K1, additives and auxiliaries which are typically added during emulsion polymerization. By way of example, the at least one other component K1 can be selected from agglomerating agents, emulsifiers, molecular weight regulators, initiators, salts, acids and bases, as described above. Other materials that can also be used as component K1 are the additives described at a later stage as component K2, these typically being added to ABS graft copolymers or to ABS molding compositions.

In order to protect the graft copolymers B from thermal degradation during work-up, and in order that the work-up can be carried out safely and reliably, it is frequently conventional to add antioxidants as component K1. By way of example, it is possible to add, preferably after the emulsion polymerization (step a), one or more phenolic antioxidants, and also any desired other substances which increase the thermal stability of the graft copolymers. A typical procedure uses stirring to mix these antioxidants, e.g. in the form of emulsions or dispersions, with the graft copolymer B.

The optional components K1 described can be added at a suitable point in the process of the invention for the production of the graft copolymer composition. The process described above of the invention typically comprises one or more steps comprising addition of the at least one optional component K1. These steps of addition of component K1 typically take place at any desired point in the process, or at a suitable point therein.

Step b)

The step b) of the invention comprises the precipitation of the latex L of the at least one graft copolymer B after emulsion polymerization, preferably in a continuous step, via addition of at least one precipitation solution F comprising at least one salt and/or at least one acid, where a precipitation solution F1 and a portion of the latex L1 (where this expression also comprises the entire latex L) are mixed in a first container H1 at a temperature $T_1$ in the range from 30 to 80° C., preferably from 35 to 75° C., particularly preferably from 40 to 70° C., with particular preference from 40 to 60° C., and the mixture of latex L1 with precipitation solution F1 is passed into at least two further containers H2 and H3 with temperatures $T_2$ and $T_3$ in the range from 60 to 130° C., preferably from 82 to 98° C., particularly preferably from 60 to 90° C.; where optionally further portions of the latex L2 and/or L3 and optionally further precipitation solutions F2 and/or F3 are added here.

The expression "mixture of latex L with precipitation solution F" used hereinafter means, as required by the embodiment, a mixture of latex L1 with precipitation solution F1 and optionally with further portions of the latex L2 and/or L3 and optionally with further precipitation solutions F2 and/or F3.

It is preferable that the mixture of latex L1 with precipitation solution F1 is passed into precisely two further containers H2 and H3 with temperatures $T_2$ and $T_3$. It is further preferable that the mixture of latex L1 with precipitation solution F1 is passed into precisely three further containers H2, H3 and H4 with temperatures $T_2$, $T_3$ and $T_4$.

The compositions of the precipitation solutions F1, F2 and F3 can be identical or different. The precipitation solutions F, F1, F2 and F3 are typically aqueous solutions comprising at least one salt and/or at least one acid. The entire precipitation solution F used is preferably composed of the portions F1, F2 and F3, with particular preference of F1 together with F2; it is further preferable that F1 is the entire precipitation solution F used.

It is therefore preferable that the entire quantity of the precipitation solution F is added in the first container.

In the step b) described, latex L comes into contact with precipitation solution F (electrolyte solution); precipitation of the graft copolymer latex L begins in the precipitation container H1, and is continued in the at least 2 further, downstream precipitation containers H2 and H3, which are preferably equipped with stirrers. Precipitation of the at least one graft copolymer latex L can preferably be achieved via continuous or batchwise addition of the precipitation solution F.

In a preferred embodiment, the step b) of the invention comprises precipitation of at least one graft copolymer selected from B-I, B-II, B-VI and B-V, in each case in its latex form, via addition of the at least one precipitation solution F comprising at least one salt and/or acid. It is moreover possible that one or more of the graft copolymers selected from B-I, B-II, B-VI and B-V is/are homogeneously mixed after the emulsion polymerization and that the mixture (in the form of a latex) is then precipitated via addition of the at least one precipitation solution F.

In a preferred embodiment, the step b) of the invention comprises mixing of the graft copolymers B-I and B-II and precipitation of the mixture of the graft copolymers via addition of the at least one precipitation solution F comprising at least one salt and/or acid. In particular here, the graft copolymers B-I and B-II respectively in their latex form are homogeneously mixed after the emulsion polymerization. The resultant latex mixture of the graft copolymers B-I and B-II is further worked-up as described in steps c) and optionally d).

Precipitation solution F used for the precipitation of the at least one graft copolymer B after the emulsion polymerization can in particular be aqueous salt solutions, for example aqueous solutions of magnesium sulfate, kieserite $(Mg[SO_4].H_2O)$, pentahydrite $(Mg[SO_4].5H_2O)$, hexahydrite $(Mg[SO_4].6H_2O)$ and epsomite $(Mg[SO_4].7H_2O$, Epsom salt), calcium chloride, sodium chloride or a mixture thereof. It is also preferable that an aqueous acid solution is used as precipitation solution, preferred acids being sulfuric acid, acetic acid or a mixture thereof. It is preferable to use inorganic salts. In a preferred embodiment, the precipitation solution F (in particular F1 and optionally F2 and/or F3) comprises at least one salt selected from magnesium sulfate, calcium chloride and sodium chloride and/or at least one inorganic acid, preferably sulfuric acid. A sulfuric acid with concentration in the range from 0.1 to 20% by weight, preferably from 0.5 to 20% by weight, can preferably be used as precipitation solution F.

It is preferably also possible to use a mixture of aqueous salt solutions with acids (e.g. sulfuric acid, acetic acid) as precipitation solution.

It is particularly preferable that the precipitation of the at least one graft copolymer B in step b) is achieved via action of a combination of aqueous salt solutions and aqueous acid solutions, preferably of the abovementioned salts and acids. It is very particularly preferable that the precipitation is achieved via action of a combination of an aqueous solution of magnesium sulfate with sulfuric acid with concentration in the range from 0.1 to 20% by weight, preferably from 0.5 to 20% by weight.

In a preferred embodiment, the precipitation solution F comprises a portion $S_R$ (returned proportion of the extracted serum S) of the serum extracted in step c). In particular, the precipitation solution in this embodiment comprises, as fresh electrolyte solution, one or more of the aqueous salt solutions and/or aqueous acid solutions described above, and a portion $S_R$ (returned proportion of the extracted serum S) of the serum extracted in step c). It is preferable that the precipitation solution F consists of the components mentioned.

In a particularly preferred embodiment, an aqueous magnesium sulfate solution and/or a sulfuric acid (from 0.5 to 20% by weight) is/are added continuously and simultaneously in one or more stages to the latex L of the graft copolymer B.

In a preferred embodiment, the precipitation solution F is premixed from the returned proportion of the serum $S_R$ and from fresh aqueous salt solution and/or fresh aqueous acid solution, and is mixed completely or in part in the form of F1 and optionally in the form of F2 and/or F3 with the latex L in the containers H1 and optionally in H2 and/or H3. In this embodiment, the compositions of the precipitation solutions F1, F2 and F3 are identical. Proportions typically introduced of the entire precipitation solution F (premixed solution made of $S_R$ and of fresh aqueous salt solution and/or fresh aqueous acid solution) are from 50 to 100% by weight in the form of F1 in the container H1, from 0 to 10% by weight in the form of F2 in the container H2, and from 0 to 10% by weight in the form of F3 in the container H3.

Proportions typically introduced of the total quantity of latex L are from 50 to 100% by weight in the form of L1 in the container H1, from 0 to 10% by weight in the form of L2 in the container H2, and from 0 to 10% by weight in the form of L3 in the container H3. It is preferable that the entire precipitation solution F and the entire latex L are mixed in the container H1, i.e. that L1 is 100% by weight of L and that F1 is 100% by weight of F.

It is preferable that no further addition of precipitation solution F and/or latex L takes place in the container H3. It is particularly preferable that only the mixture from container H2 is passed into the container H3 (the quantities of L3 and of F3 being zero).

It is preferable that from 50 to 100% by weight of the entire precipitation solution F made of acid solution and/or of salt solution, and also $S_R$, are premixed before said solution is mixed with the latex L or L1 in container H1. In principle, it is also possible to begin by mixing a concentrate comprising at least one salt and/or at least one acid, as precipitation solution F1 with the latex L1 in the container H1, and to introduce the predominant quantity of the returned serum $S_R$ in the form of F2 in the container H2. In a preferred embodiment of the process, from 50 to 100% by weight of the entire precipitation solution F are introduced in the form of F1 with from 90 to 100% by weight of the entire quantity of latex L in the form of L1 in the container H1, and from 0 to 10% by weight of the entire quantity of latex L are introduced in the form of L2 in the container H2. This particular embodiment of the process is preferred when the intention is to use continuous mechanical dewatering with avoidance of fine powder fractions, e.g. when pusher centrifuges are used.

In a preferred embodiment, the mixing of the latex L1 with the precipitation solution L1 takes place in the first container H1 by virtue of the flow of the two streams L1 and F1; the design of the container H1 here can in principle be as desired. However, it is also possible to use a static mixer or stirrer to carry out the mixing in the container H1; in particular, container H1 can take the form of a stirred container, for example in the form of stirred tank. In a preferred embodiment, the first container H1 is a flow tube. A possible embodiment is a tube section into which the two streams, precipitation solution F1 and graft copolymer latex L1, are metered and from which they are discharged as mixture in the direction of the container H2.

In a preferred embodiment, the at least two downstream containers, e.g. H2 and H3 or H2, H3 and H4, are continuously operated stirred containers, for example continuous stirred tanks.

The volume $V_1$ of the first container H1 in the invention is less than or equal to 30% of the volume $V_2$ of the second container H2, preferably less than or equal to 10%, particularly preferably less than or equal to 5%. In a preferred embodiment, the volume $V_1$ of the first container H1 is less than or equal to 30% of the volume $V_2$ of the second container H2 and of the third container H3, preferably less than or equal to 10%, particularly preferably less than or equal to 5%.

In a preferred embodiment, the at least two further containers, in particular H2 and H3, have identical volume and/or are of identical design.

The volume $V_1$ of the first container H1 is preferably from 0.1 to 30% of the volume $V_2$ of the second container H2, preferably from 0.1 to 10%, with particular preference from 0.5 to 5%. The volume $V_1$ of the first container H1 is preferably from 0.1 to 10% of the volume $V_2$ of the second container H2 and of the volume of the third container H3, preferably from 0.5 to 5%.

In a preferred embodiment, the process in step b) comprises, as the final stage, passage of the mixture of precipitation solution and latex, or of precipitated latex, into a cooling container before dewatering (step c). In a preferred embodiment, the cooling container can be a spiral heat exchanger, for example as described in DE 10 2006 044 270 A1. It is preferable that the temperature in the cooling container is in the range from 20 to 80° C., preferably from 20 to 70° C. The mixture from container H3 can preferably be cooled in a further container H4, e.g. a spiral heat exchanger, to a temperature $T_4$ that is below 70° C. The mixture from container H4 can preferably be cooled in a further container H5, e.g. a spiral heat exchanger, to a temperature $T_4$ that is below 70° C.

The temperature $T_1$ in the first container H1 is from 30 to 80° C., preferably from 35 to 75° C., particularly preferably from 40 to 70° C., with particular preference from 40 to 60° C. The temperatures T in the containers H typically relate to the average temperature of the content of the appropriate container.

The temperatures in the at least two further containers, in particular $T_2$ and $T_3$ in the containers H2 and H3, are typically in the range from 60 to 130° C., preferably from 82 to 98° C., particularly preferably from 60 to 90° C.

In a preferred embodiment, the temperature $T_2$ in the container H2 is higher than the temperature $T_1$ in container H1 by at least 10° C., preferably by at least 15° C.

It is preferable that the temperature of the precipitation container H2 is lower than that of precipitation container H3, but higher than that of precipitation container H1 (i.e. that $T_1<T_2<T_3$). It is preferable that the temperature $T_2$ in container H2 is lower than the temperature $T_3$ in container H3 by at least 10° C., preferably by at least 15° C.

In another embodiment, the temperature $T_2$ in container H2 is the same as, or almost the same as, the temperature $T_3$ in container H3. In another preferred embodiment, the temperature $T_2$ in container H2 is the same as, or almost the same as, the temperature $T_3$ in container H3 and the temperatures in the optional downstream containers, e.g. H4 and/or H5.

In a preferred embodiment, the temperature $T_1$ in container H1 is in the range from 40 to 60° C., the temperature $T_2$ in container H2 is in the range from 61 to 84° C. and the temperature $T_3$ in container H3 is in the range from 85 to 100° C.

In a preferred embodiment, the average residence time $t_1$ in the container H1 is at least one second (s), preferably at least 5 s, more preferably at least 10 s, more preferably at least 15 s. In a preferred embodiment, the average residence time $t_1$ in the container H1 is at most 3000 s, preferably at most 1000 s, particularly preferably at most 100 s. It is preferable that the average residence time $t_1$ of the mixture of latex L and precipitation solution F (in particular latex L1 and precipitation solution F1) in the container H1 is in the range from 1 to 1000 s, preferably from 5 to 100 s, with particular preference from 10 to 50 s.

The average residence time $t_2$ and/or $t_3$ respectively in container H2 and H3 is typically at least 5 minutes (min), preferably at least 10 min, particularly preferably at least 15 min. It is preferable that the average residence time of the mixture of latex L and precipitation solution F in the containers H2 and H3 is respectively in the range from 5 to 60 min; preferably from 10 to 45 min; particularly preferably from 10 to 35 min. The residence times in the following optional containers H4, H5, etc. are typically the same as in H2 and H3. In a preferred embodiment, the average residence times $t_2$ and $t_3$ are identical, or almost identical.

In a preferred embodiment, the ratio of the average residence time $t_1$ in the first container H1 to the average residence time $t_2$ in the second container H2 ($t_1/t_2$) is in the range from 1:10 to 1:1000, preferably 1:20 to 1:500.

Step c)

The step c) of the invention comprises the mechanical dewatering of the precipitated graft copolymer B from step b), preferably by means of centrifuging and/or filtration, where an extracted serum S and a graft copolymer B are obtained, where the residual moisture content of the graft copolymer B (also termed water-moist graft copolymer) is less than or equal to 25% by weight, preferably less than or equal to 20% by weight.

It is preferable that, after cooling to a temperature below 80° C., preferably to about 70° C., e.g. in a cooling container such as a spiral heat exchanger as in DE 10 2006 044 270 A1, the precipitated graft copolymer is isolated from the serum S by batch centrifuging, e.g. by a scraper centrifuge, or continuous centrifuging, e.g. by a pusher centrifuge, and that the water-moist graft copolymer B is obtained with residual moisture content 25% by weight.

The residual moisture content (also termed water content) is the proportion of water in percent by weight, based on the moist graft copolymer B. In particular, the water content is determined with the aid of suitable analysis equipment (e.g. drying and weighing devices), where the sample is dried until constant sample weight has been achieved over a defined period. By way of example, the water content of the graft copolymer B can be determined in a Halogen Moisture Analyzer HR73 from Mettler-Toledo at 180° C. until constant weight has been achieved for 30 seconds.

It is preferable that step c) or a downstream washing step as described below gives a graft copolymer B with water content in the range from 5 to 25% by weight, preferably from 10 to 25% by weight, with particular preference from 12 to 20% by weight.

It is preferable that the mechanical dewatering of the precipitated graft copolymer B is achieved by means of centrifuging. The precipitated graft copolymer is typically centrifuged with centripetal acceleration of from 200 to 1000 g (where g means average acceleration due to gravity), preferably from 300 to 800 g for a period of from 1 second to minutes, preferably from 1 to 120 seconds.

During or after centrifuging, it is possible to carry out an optional washing step, preferably with water, in order to reduce the content of water-soluble electrolytes. In one embodiment, the mechanical dewatering of the graft copolymer B is followed by a washing step where the dewatered graft copolymer B is preferably treated with water or with a mixture of water with a polar, water-miscible organic solvent. It is preferable that the water or the mixture is extracted by filtration or centrifuging after the treatment. This preferably produces a graft copolymer B with water content less than or equal to 25% by weight. It is preferable that the water content of the graft copolymer B after the optional washing step is as stated above.

It is preferable that a portion $S_R$ (returned proportion) of the serum S extracted in the step c) from the graft copolymer B is returned to the precipitation process and by way of example used as part of the premixed precipitation solution F. The remaining proportion $S_A$ of the serum S extracted is typically discharged in the form of wastewater and sent for disposal. The proportion returned in the form of $S_R$ of the serum S extracted is typically from 15 to 65% by weight, preferably from 25 to 55% by weight.

Step d)

The optional step d) comprises the drying of the dewatered graft copolymer B from step c). In a preferred embodiment, the process comprises the step d):

d) drying of the dewatered graft copolymer B from step c), where a graft copolymer powder is obtained with residual moisture content less than or equal to 5% by weight.

It is preferable that the drying of the water-moist graft copolymer B with residual moisture content less than or equal to 25% by weight is achieved with use of a drying gas, where the graft copolymer B is caused to move within the drying gas (e.g. is entrained by the current of drying gas) and the temperature of the drying gas is in the range from 50 to 160° C., preferably from 55 to 155° C., particularly preferably from 60 to 150° C. It is preferable to use air, nitrogen or any desired mixture thereof as drying gas.

In a preferred embodiment, the drying of the dewatered graft copolymer B in step d) is achieved with use of a fluidized-bed dryer and/or of a pneumatic dryer (flash dryer). In particular, the drying in step d) is achieved as described in WO2017/093468.

Fluidized-bed dryers and pneumatic dryers (flash dryers) are known to the person skilled in the art. In particular, they are drying devices for pairable, particulate materials, as described in Krischer/Kroll, Trocknungstechnik, Zweiter Band, Trockner and Trocknungsverfahren [Drying technology, volume 2, Dryers and drying processes] (Springer-Verlag, 1959).

In particular, the drying in step d) is carried out with use of a fluidized-bed dryer where the temperature of the drying gas is in the range from 50 to 100° C., preferably from 55 to 90° C., particularly preferably from 60 to 85° C. and the average residence time of the graft copolymer B in the fluidized-bed dryer is from 1 to 60 min, preferably from 5 to 50 min, particularly preferably from 10 to 40 min.

In particular, the drying in step d) is carried out with the use of a pneumatic dryer where the temperature of the drying gas is in the range from 100 to 160° C., preferably from 110 to 155° C., particularly preferably from 130 to 150° C. and the average residence time of the graft copolymer B in the pneumatic dryer is typically from 1 to 300 seconds, preferably from 1 to 120 seconds, particularly preferably from 5 to 60 seconds.

In a preferred embodiment, the residual moisture content of the dried graft copolymer powder obtained in step d) is in the range from 0.01 to 5% by weight, preferably from 0.05 to 2% by weight, with particular preference from 0.1 to 1% by weight.

The graft copolymer composition described above, for example the dried graft copolymer powder, can be mixed with one or more thermoplastic copolymers A, in particular one or more SAN copolymers, and optionally with other additives K2, where a thermoplastic molding composition is obtained.

The invention therefore moreover provides a process for the production of a thermoplastic molding composition, in particular of an ABS molding composition, comprising:

A: from 5 to 95% by weight, preferably from 40 to 80% by weight, of at least one thermoplastic copolymer A produced from:
  A1: from 50 to 95% by weight, preferably from 65 to 80% by weight, particularly preferably from 69 to 80% by weight, based on the copolymer A, of at least one monomer A1 selected from styrene, α-methylstyrene, p-methylstyrene and $C_1$-$C_8$-alkyl (meth) acrylate (e.g. methyl methacrylate, ethyl methacrylate, n-butyl acrylate, tert-butyl acrylate), and
  A2: from 5 to 50% by weight, preferably from 20 to 35% by weight, particularly preferably from 20 to 31% by weight, based on the copolymer A, of at least one monomer A2 selected from acrylonitrile, methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide),
B: from 5 to 95% by weight, preferably from 20 to 60% by weight, of at least one graft copolymer composition produced by a process as described above, and
K2: from 0 to 90% by weight, preferably from 0 to 40% by weight, particularly preferably from 0 to 5% by weight, frequently from 0.1 to 5% by weight, of at least one other component K2,
comprising the steps of
  a) to c) and optionally d) as described above, and also
  e) mixing of the at least one thermoplastic copolymer A, the at least one graft copolymer composition and optionally the at least one other component K2.

For the purposes of the present invention, ABS molding compositions are molding compositions comprising at least 10% by weight, preferably at least 60% by weight, particularly preferably at least 95% by weight, of the thermoplastic copolymer A and the graft copolymer B (in total) as described above. It is preferable that the ABS molding composition comprises only the thermoplastic copolymer A and the graft copolymer B as polymeric components. For the purposes of the present invention, the definition of ABS molding compositions also covers polymer blends comprising the thermoplastic copolymer A and the graft copolymer B as described above and at least one rubber-free thermoplastic resin not composed of vinyl monomers, for example a polycondensate, preferably selected from polycarbonates, polyester carbonates, polyesters and polyamides (as component K2).

For the purposes of the present invention, "(meth)acryl . . . ", for example in (meth)acrylic acid or $C_1$-$C_8$-alkyl (meth)acrylate, comprises the corresponding acrylic and/or methacrylic compounds.

For the purposes of the present invention, the unit ppm relates to mg/kg.

It is preferable that the thermoplastic copolymer A is a rubber-free copolymer A.

With particular preference, the thermoplastic copolymer A is produced from (or consists of):
- A1: from 50 to 95% by weight, preferably from 65 to 80% by weight, particularly preferably from 69 to 80% by weight, based on the copolymer A, of a monomer A1 selected from styrene, α-methylstyrene and mixtures of styrene with at least one other monomer selected from α-methylstyrene, p-methylstyrene and $C_1$-$C_8$-alkyl (meth)acrylate (e.g. methyl methacrylate, ethyl methacrylate, n-butyl acrylate, tert-butyl acrylate),
- A2: from 5 to 50% by weight, preferably from 20 to 35% by weight, particularly preferably from 20 to 31% by weight, based on the copolymer A, of a monomer A2 selected from acrylonitrile and mixtures of acrylonitrile with at least one other monomer selected from methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide).

With particular preference, the thermoplastic copolymer A is produced from (or consists of):
- A1: from 50 to 95% by weight, preferably from 65 to 80% by weight, particularly preferably from 69 to 80% by weight, with particular preference from 71 to 80% by weight, based on the copolymer A, of the monomer A1 selected from styrene, α-methylstyrene and mixtures of styrene with α-methylstyrene, and
- A2: from 5 to 50% by weight, preferably from 20 to 35% by weight, particularly preferably from 20 to 31% by weight, with particular preference from 20 to 29% by weight, based on the copolymer A, of a monomer A2 selected from acrylonitrile and mixtures of acrylonitrile with methacrylonitrile.

Particular preference is given to a thermoplastic copolymer A which comprises less than or equal to 30% by weight of acrylonitrile, based on the entire copolymer A.

In a preferred embodiment, monomer A1 is styrene or α-methylstyrene and monomer A2 is acrylonitrile. In an embodiment to which further preference is given, monomer A1 is a mixture of styrene and α-methylstyrene and monomer A2 is acrylonitrile, where the mixture for monomer A1 comprises at least 10% by weight of styrene, preferably at least 50% by weight and particularly preferably at least 90% by weight.

The average molar mass $M_w$ of the thermoplastic copolymer A is preferably in the range from 20 000 to 200 000 g/mol. The limiting viscosity [n] of the thermoplastic copolymer A is preferably in the range from 20 to 110 ml/g (measured in dimethylformamide at 25° C.). Details concerning the production of the thermoplastic copolymer A are described by way of example in DE-A 24 20 358 and DE-A 27 24 360. Equally suitable thermoplastic copolymers A are also described in DE-A 1 971 3509.

The thermoplastic copolymers can be produced either via purely thermal initiation or via addition of initiators, in particular of peroxides. Suitable thermoplastic copolymers A can preferably be produced by bulk polymerization or solution polymerization.

The thermoplastic copolymers A can be added alone or in any desired mixture.

Other Components K2

The thermoplastic molding compositions can optionally comprise a quantity of from 0 to 90% by weight, based on the entire molding composition, of one or more other components K2, preferably from 0 to 40% by weight, frequently from 0.1 to 90% by weight, preferably from 1 to 40% by weight. Component K2 can in particular be a conventional additive and/or another polymeric component, examples being aromatic polycarbonates, aromatic polyester carbonates, polyesters and polyamides.

The molding composition can typically comprise from 0 to 5% by weight, based on the entire molding composition, of at least one other component K2 selected from conventional additives and additional substances, preferably from 0.1 to 5% by weight. In particular, it is possible here to add the additives that are required or advantageous during production, work-up, further processing and final shaping, examples being antioxidants, UV stabilizers, peroxide-destroyers, antistatic agents, lubricants, mold-release agents, flame retardants, fillers or reinforcing materials (glass fibers, carbon fibers, etc.), and colorants.

The thermoplastic molding composition can in particular comprise, as other component K2, rubber-free thermoplastic resins not composed of vinyl monomers. In particular, these thermoplastic resins are polycondensates, e.g. aromatic polycarbonates, aromatic polyester carbonates, polyesters and polyamides.

Suitable thermoplastic polycarbonates and polyester carbonates are known and described by way of example in DE-A 14 95 626, DE-A 22 32 877, DE-A 27 03 376, DE-A 27 14 544, DE-A 30 00 610, DE-A 38 32 396, DE-A 30 77 934, and also in particular in DE-A 100 08 420 and EP-A 2 606 073.

The thermoplastic molding composition (ABS blend) can typically comprise, as other component K2, from 10 to 90% by weight, preferably from 10 to 60% by weight, particularly preferably from 10 to 40% by weight, based on the entire thermoplastic molding composition, of at least one rubber-free thermoplastic resin which is not composed of vinyl monomers and is preferably selected from polycarbonates and polyamides.

In a preferred embodiment, the graft copolymers B-I and B-II described above are mixed after separate production and, in step b), precipitated together (co-precipitated). The worked-up graft copolymer is then typically mixed in step e) with the thermoplastic copolymer A and optionally with other components K2.

Another possibility alongside the above is that the graft copolymers B-I and B-II described above are worked up separately after separate production, i.e. that the steps a) to c) and optionally d) of the invention (production and precipitation of the graft copolymers, dewatering of the water-moist graft copolymers and optionally drying) are done separately and that the worked-up graft copolymers B-I and B-II are mixed in step e) with the thermoplastic copolymer A and optionally with other components K2.

Step e)

The step e) of the invention comprises the mixing of the at least one thermoplastic copolymer A with the at least one graft copolymer composition obtained via the process described above of the invention, for example the dried graft copolymer powder B from step d), and optionally with the other component(s) K2.

The processes and devices for carrying out the step e) are in essence known to the person skilled in the art. Step e) typically comprises compounding in the melt and/or extrusion in the melt, and is preferably carried out with the use of internal mixers and/or of extruders and/or twin-screw systems. The mixing in step e) preferably takes place at temperatures of from 200 to 300° C. In particular, the mixing of the thermoplastic copolymer A, the graft copolymer composition and optionally the other component(s) K2 in step e) takes place in an extruder at a temperature in the range from 200 to 300° C.

The mixing of the thermoplastic copolymer A, the at least one graft copolymer composition, for example the dried graft copolymer powder B from step d), and optionally other components K2 can take place in a known manner, either successively or simultaneously. It is moreover possible that some components are first mixed at temperatures of from 15 to 40° C., in particular at room temperature (about 20° C.), and that subsequently the temperature is increased to from 200 to 300° C.; other components K2 can optionally be added here.

In another preferred embodiment, the dewatered graft copolymer B obtained in step c) can be mixed with one or more thermoplastic copolymers A, in particular with one or more SAN copolymers, in the melt, and then dried in an extruder or in a compounding system. The drying can take place by way of example as in EP 0 768 157 A1, EP 0 867 463 A1, WO 03/099 926 A1, EP 2 584 001 A1 and WO 2008/020012 A2. This gives a molding composition as described, which can optionally be mixed with other components K2 and worked up to give pellets.

The thermoplastic molding compositions produced by the process of the invention can be used for the production of moldings of any type. These can be produced by injection molding, extrusion or blow molding processes. Another type of processing is the production of moldings by thermoforming from previously produced sheets or films, and the in-mold film-coating process. Examples of these moldings are films, profiles, housing parts of any type, e.g. for household devices such as juice presses, coffee machines, mixers; for office machines such as monitors, printers, copiers; external and internal parts for automobiles; sheets, pipes, electrical-installation ducts, windows, doors, and other profiles for the construction sector (fitting-out of interiors and external applications), and also electrical and electronic parts such as switches, plugs and plug sockets.

In particular, the molding compositions of the invention can be used by way of example for the production of the following moldings:

Parts for internal fitting-out of rail vehicles, ships, aircraft, buses and other motor vehicles; external bodywork parts in the motor vehicle sector; housings of electrical devices comprising small transformers; housings for devices for information processing and information transmission; housings and cladding of medical devices; massage devices and housings therefor; toys; toy vehicles; large-surface-area wall elements; housings for safety equipment; thermally insulated transport containers; apparatus for the keeping or care of small animals; moldings for sanitary and bathroom equipment; protective grilles for ventilation apertures; moldings for garden sheds and tool sheds; housings for garden equipment.

DESCRIPTION OF THE FIGURE

FIG. 1 is a flow diagram of a possible embodiment of the invention. A precipitation solution F1' and a portion L1 of the graft copolymer latex are added to the first precipitation container H1 with volume $V_1$ and temperature $T_1$.

The mixture from container H1 (precipitated or preprecipitated graft copolymer latex) is passed into the second precipitation container H2 with volume $V_2$ and temperature $T_2$. The mixture from container H2 (precipitated graft copolymer latex) is passed into the third precipitation container H3 with volume $V_3$ and temperature $T_3$.

A portion $S_A$ of the serum (or mother liquor) extracted during the dewatering in step c) is discharged, and a portion $S_R$ of said serum is returned. Various fractions S1, S2 and S3 of the returned fraction of the serum $S_R$ can be introduced into the containers H1, H2 and/or H3. It is moreover possible to add fresh electrolyte solution (precipitation solution) F1', F2' or F3' comprising at least one acid and/or one salt into the containers H1, H2 and/or H3. It is moreover possible first to mix the returned serum portion S1 with the fresh precipitation solution F1' (broken-line arrow) before adding same to the latex L1 in container H1. This applies equally to S2/F2' and S3/F3' and to the containers H2 and H3.

The portion L1 is preferably at least 90% by weight of the total quantity of the latex L (graft copolymer B after the emulsion polymerization). It is equally preferable that the portion L1 is 90% by weight and that L2 is 10% by weight of the total quantity of the latex L.

The invention is explained further via the examples and claims that follow.

EXAMPLES

Example 1—Production of the ABS Rubbers (Graft Copolymer B)

1.1 Emulsion Polymerization

Graft Polymer B-I-a 30 parts by weight (calculated as solid) of an anionically emulsified polybutadiene latex with average particle diameter $D_{50}$ 299 nm and gel content 60% by weight, produced with use of a polybutadiene seed latex with average particle diameter $D_{50}$ 113 nm via free-radical emulsion polymerization, and 30 parts by weight (calculated as solid) of an anionically emulsified polybutadiene latex with average particle diameter $D_{50}$ 371 m and gel content 82% by weight, produced with use of a polybutadiene seed latex with average particle diameter $D_{50}$ 113 nm via free-radical emulsion polymerization were mixed and brought to solids content about 27% by weight with deionized water.

The mixture of the polybutadiene latices was heated to 60° C. and 0.5 part by weight of potassium peroxodisulfate (dissolved in water) was admixed therewith. 40 parts by weight of a monomer mixture made of 73% by weight of styrene, 27% by weight of acrylonitrile and 0.1 part by weight of tert-dodecyl mercaptan were then added uniformly within 6 hours. In parallel with the above, 1 part by weight (calculated as solid substance) of the sodium salt of a resin acid mixture (dissolved in alkalinified water) was added over a period of 6 hours. During the course of the 6 hours, the reaction temperature was raised from 60° C. to 80° C. Once all of the additions had ended, reaction was continued for 2 hours at 80° C. The graft latex was then cooled to room temperature. The solids content of the graft copolymer latex was 34.9% by weight, determined gravimetrically (drying in convection drying oven at 180° C. for 23 minutes).

Graft Copolymer B-I-b

A mixture of polybutadiene latices was produced as described for B-I-a.

40 parts by weight of a monomer mixture of 75% by weight of styrene and 25% by weight of acrylonitrile was added within a period of 4 hours to the mixture of polybutadiene latices. With start of the monomer addition, 0.14 part by weight of tert-butyl hydroperoxide and 0.14 part by weight of sodium ascorbate were added as initiator over a period of 9 hours; at the same time, 1.7 parts by weight (calculated as solid substance) of the sodium salt of a resin acid mixture (dissolved in alkalinified water) were added over a period of 6 hours. Over the course of the first 6 hours the reaction temperature was raised from 60° C. to 80° C.

After the end of initiator addition, the reaction was continued for one hour at 80° C. The graft latex was then cooled to room temperature. The solids content of the graft copolymer latex was 35.0% by weight, determined gravimetrically (drying in convection drying oven at 180° C. for 23 minutes).

Graft copolymer B-II 50 parts by weight (calculated as solid) of an anionically emulsified polybutadiene latex with average particle diameter $D_{50}$ 113 nm and with gel content 91% by weight, produced with use of a polybutadiene seed latex with average particle diameter $D_{50}$ 49 nm via Free-radical seed polymerization, were brought to about 27% by weight solids content with deionized water.

The polybutadiene latex was heated to 60° C., and 0.5 part by weight of potassium peroxodisulfate (dissolved in water) was admixed therewith. 50 parts by weight of a mixture of 73% by weight of styrene, 27% by weight of acrylonitrile and 0.1 part by weight of tert-dodecyl mercaptan were added uniformly within 6 hours. In parallel with the above, 1 part by weight (calculated as solid substance) of the sodium salt of a resin acid mixture (dissolved in alkalinified water) was added over a period of 6 hours. During the course of the 6 hours, the reaction temperature was raised from 60° C. to 80° C. Once all of the additions had ended, reaction was continued for 2 hours at 80° C. The graft latex was then cooled to room temperature. The solids content of the graft copolymer latex was 35.2% by weight, determined gravimetrically (drying in convection drying oven at 180° C. for 23 minutes).

Graft Copolymer B-III 60 parts by weight (calculated as solid) of an anionically emulsified polybutadiene latex with average particle diameter $D_{50}$ 330 nm and with gel content 85% by weight were brought to about 28% by weight solids content with deionized water and heated to 60° C.

40 parts by weight of a monomer mixture consisting of 74% by weight of styrene and 26% by weight of acrylonitrile, and also 0.4 part by weight of tert-dodecyl mercaptan and 0.4% by weight of the sodium salt of a resin acid mixture (dissolved in alkalinified water) were uniformly added within 3 hours. The graft polymerization of the monomers onto the graft base was carried out by using 0.005 part by weight of iron(II) sulfate heptahydrate, 0.22 part by weight of dextrose, 0.17 part by weight of sodium diphosphate decahydrate, and also 0.11 part by weight of cumene hydroperoxide. The temperature here was raised within 4 hours from 60° C. to 72° C., and kept at 70° C. for a further 2 hours. The reaction mixture was then cooled to 55° C. within 1.5 hours. The graft latex was then cooled to room temperature. The solids content of the graft copolymer latex was 35.1% by weight, determined gravimetrically (drying in convection drying oven at 180° C. for 23 minutes). 0.25% by weight of phenolic antioxidant and 0.25% by weight of thiolic antioxidant were admixed with the dispersion.

1.2 Precipitation of the Graft Copolymers B after Emulsion Polymerization by Mixing of the Precipitate Solution F (Electrolyte Solution) with the Graft Copolymer Latices L.

Example 1A (of the Invention)

The graft copolymers B-I-a and B-II (in the form of latices) were mixed by stirring in the ratio 60%:40%, calculated as solid. 1.0% by weight of a phenolic antioxidant (Irganox 1076, BASF SE), based on the total solids of the graft copolymer mixture B-I-a and B-II, was added in the form of a dispersion to the said mixture, and mixed.

This mixture and a precipitation solution F (electrolyte solution) described below were continuously mixed in the container H1 at a temperature of from 45 to 50° C. The temperature of the graft copolymer mixture here is about 30 to 35° C. and the temperature of the electrolyte solution here is about 60 to 68° C. The following streams were continuously added here to the container H1 and thus mixed:

100 parts by weight per hour of the graft copolymer mixture B-I and B-II in the form of 35.0% by weight latex precipitation solution F-I (electrolyte solution) consisting of a mixture of 75 parts by weight per hour of returned serum fraction S-I (cf. S1 in FIG. 1);

2.8 parts by weight per hour of an 18% by weight aqueous magnesium sulfate solution and 0.51 part by weight per hour of a 15% by weight aqueous sulfuric acid solution The mixture from container H1 was passed into a second container H2. The temperature in the precipitation container H2 was kept at 94° C. (product temperature of the precipitated graft copolymer dispersion) by feeding steam into the precipitation container H2. No further precipitation solution and no further latex L were passed into container H2. The mixture from container H2 was passed into a third container H3. The temperature in the precipitation container H3 was 92° C. No substances other than the continuous feed from the precipitation container H2 were added to the precipitation container H3.

The volume of the container H1, configured as tube, was 2.0% of the volume of the precipitation container H2; the container H1 was 100% filled.

The average residence time $t_1$ in the container H1 was 30 seconds (s). The average residence time in the containers H2 and H3 was respectively 21 minutes; each of the containers was 85% filled.

There was a further container H4 downstream, which comprised a continuously operated circuit with a spiral heat exchanger, with the aid of which the product temperature of the precipitated graft copolymer dispersion was kept at 70° C. The average residence time in the container H4 was 21 minutes (min).

The containers H2 to H4 had stirrers with which the contents were continuously mixed.

The precipitated graft copolymer was isolated from the serum S by batch centrifuging by a scraper centrifuge at a temperature of 70° C. and with centripetal acceleration $a_z$ 511 g (where g is average acceleration due to gravity) for a period of 26 seconds, thus giving a water-moist graft copolymer B with residual moisture content 21.2% by weight.

Residual moisture content is defined as the proportion of water in a water-moist mixture. Residual moisture content RMC was determined gravimetrically by drying a sample weighing about 2.5 g at 180° C. to constant weight, or at most for 10 minutes.

The water-moist graft copolymer was dried in a pneumatic dryer. Grain size $D_{50}$ [mm], bulk density [kg/L] and residual moisture content after drying were determined. Grain size $D_{50}$ was measured by sieve analysis in accordance with ISO 3310-1 with the following sieves 63, 100, 150, 200, 300, 500, 800 and 2000 μm.

A portion of the serum (returned serum $S_R$) was returned as described above to the process. The serum comprised 768 mg/L of total organic carbon (TOC). The serum fraction $S_A$ not returned to the precipitation process was sent for disposal as wastewater and requires treatment to reduce the TOC loading.

Example 1B (not of the Invention)—without Container H1

The precipitation of a mixture of the graft copolymer latices B-I-a and B-II (60:40) was carried out in a manner similar to that of example 1A, but without the container H1. The precipitation solution F-I and the graft copolymer latices were added separately by way of separate lines to the precipitation container H2. All of the other precipitation parameters, for example temperatures, flow rates and residence times, were the same as in example 1A.

The precipitated graft copolymer was substantially isolated from the serum S by batch centrifuging by a scraper centrifuge at a temperature of 70° C. and with centripetal acceleration $a_z$ 581 g (where g is average acceleration due to gravity) for a period of 67 seconds, thus giving a water-moist graft copolymer B with residual moisture content 27.1% by weight. This material was dried as described in example 1A in a pneumatic dryer.

Example 1C (of the Invention)

The precipitation was carried out fundamentally in the same way as in example 1A, but with a higher temperature of from 50 to 55° C. in precipitation container H1, a lower temperature in precipitation container H2 (86° C.) and a higher temperature in precipitation container H3 (94° C.). The further treatment likewise took place as described in example 1A.

Example 1D (of the Invention)

The precipitation was carried out fundamentally in the same way as in example 1A, but with a higher temperature in the precipitation container H1 (50-55° C.), a lower temperature in precipitation container H2 (78° C.) and a higher temperature in precipitation container H3 (94° C.). The further treatment likewise took place as described in example 1A.

Example 1E (of the Invention)

The precipitation was carried out fundamentally in the same way as in example 1A, but with a higher temperature in precipitation container H1 (50-55° C.), a lower temperature in precipitation container H2 (70° C.) and a higher temperature in precipitation container H3 (94° C.). The further treatment likewise took place as described in example 1A.

Example 1F (of the Invention)

The precipitation was carried out fundamentally in the same way as in example 1A, but 0.23 part by weight per hour of a 50% by weight aqueous acetic acid solution (precipitation solution F-II) was used instead of 0.51 part by weight per hour of a 15% by weight aqueous sulfuric acid solution. The further treatment likewise took place as described in example 1A.

The graft copolymer is substantially isolated from the serum by batch centrifuging by a scraper centrifuge at a temperature of 70° C. and with centripetal acceleration $a_z$ 581 g (where g is average acceleration due to gravity) for a period of 33 seconds, thus giving a water-moist graft copolymer B with residual moisture content 21.0% by weight.

The water-moist graft copolymer is dried in a pneumatic dryer. Grain size $D_{50}$ [mm], bulk density [kg/L] and residual moisture content after drying were determined.

The serum S comprised 1220 mg/L of total organic carbon (TOC). The serum fraction $S_A$ not returned to the precipitation process was sent for disposal as wastewater and requires treatment to reduce the TOC loading.

Example 1G (not of the Invention): Higher Temperature in Precipitation Container H1 (94° C.)

The graft copolymers B-I and B-II (latices) were mixed by stirring in the ratio 60:40, calculated as solids. The method was analogous to that of example 1A. The graft copolymer mixture B-I and B-II and the precipitation solution F-I (electrolyte solution) were mixed continuously in the container H1 at a temperature of 94° C. For this it was necessary to heat the graft copolymer mixture to a temperature of about 94° C. and likewise to heat the precipitation solution to a temperature of about 94° C. However, this procedure proved to be disadvantageous because heating of the graft copolymer mixture produced small quantities of coagulate which rapidly led to latex-metering problems and to instability in conduct of the experiment and finally to termination of the experiment. The measured values presented in table 1 were determined on samples taken before termination. Instead of drying in the pneumatic dryer, the moist powder obtained before termination was dried for 2 days at 70° C. in a laboratory drying oven. The significantly larger grain size $D_{50}$, 0.8 mm, proved to be disadvantageous in comparison with the example 1A; this size, and the longer drying time associated therewith, are rather unsuitable for drying in a pneumatic dryer.

Example 1H (not of the Invention)—Nature and Size of Container H1

The method was analogous to that of example 1A, but a container H1 was used which was the same as container H2 in form and function, i.e. container H1 in this case was a stirred container with fill level 85% and average residence time 21 minutes. The temperature in the container H1 was 50° C.

The temperatures at which the graft copolymer mixture and the precipitation solution were used were the same as in example 1A. However, this procedure proved to be very disadvantageous because after only a very short period of operation a large quantity of coagulate accumulated on the stirrer of the container H1, and led to termination of the experiment. It was impossible to obtain any representative examples for analyses.

Example 1I (not of the Invention)—Graft Polymer B-III/without Container H1

42.8 parts by weight of the graft copolymer latex B-III were precipitated with 57.2 parts by weight of precipitation solution F-III consisting of 0.78% by weight sulfuric acid.

The streams were mixed continuously in the container H2 at a temperature of 70° C. Two further containers H3 and H4 (with the same shape and size as H2) were installed downstream. The temperature in the precipitation container H3 was 81° C., and the temperature of the container H4, through which the product finally passed, was 82° C. No substances other than the continuous feed from the precipitation container H2 were added to the precipitation container H3. The average residence time in the containers H2, H3 and H4 was respectively 15 minutes, the containers being respectively 85% filled.

There was a further container H5 installed downstream which comprised a continuously operated circuit with a spiral heat exchanger, with the aid of which the temperature of the precipitated graft copolymer dispersion was kept at 70° C.

The graft copolymer was substantially isolated from the serum by batch centrifuging by a scraper centrifuge at a temperature of 70° C. and with centripetal acceleration $a_z$ 447 g (where g is average acceleration due to gravity) for a period of 46 seconds, thus giving a water-moist graft copolymer B with residual moisture content 31.4% by weight. The water-moist graft copolymer B was dried in a pneumatic dryer. Grain size $D_{50}$ [mm], bulk density [kg/L] and residual moisture content after drying were determined.

Example 1J (of the Invention)

The precipitation is carried out as in example 1I, but the streams of the graft copolymer latex B-III and of the precipitation solution F-III were mixed in the container H1, which was configured as tube. The volume of the container H1 was 0.8% of the volume of the precipitation container H2; the container H1 was 100% filled. The temperature in precipitation container H1 was 60° C. The average residence time $t_1$ in H1 was 9 seconds, and in H2 to H4 it was respectively 15 minutes.

The precipitated graft copolymer was substantially isolated from the serum by batch centrifuging by a scraper centrifuge at a temperature of 70° C. and with centripetal acceleration $a_z$ 447 g (where g is average acceleration due to gravity) for a period of 46 seconds, thus giving a water-moist graft copolymer B with residual moisture content 20.1% by weight. The water-moist graft copolymer B was dried in a pneumatic dryer. Grain size $D_{50}$ [mm], bulk density [kg/L] and residual moisture content after drying were determined.

Example 1K (of the Invention)

The precipitation was carried out as in example 1J, except that the temperature in precipitation container H1 is 50° C.

The precipitated graft copolymer B was substantially isolated from the serum by batch centrifuging by a scraper centrifuge at a temperature of 70° C. and with centripetal acceleration $a_z$ 447 g (where g is average acceleration due to gravity) for a period of 46 seconds, thus giving a water-moist graft copolymer B with residual moisture content 20.1% by weight. The water-moist graft copolymer B was dried in a pneumatic dryer. Grain size $D_{50}$ [mm], bulk density [kg/L] and residual moisture content after drying were determined.

Example 1L (of the Invention)

The graft copolymers B-I-a and B-I-b (in the form of latices) were mixed by stirring in the ratio 25%:75%, calculated as solid. 1.0% by weight of a phenolic antioxidant (Irganox 1076, BASF SE), based on the total solids of the graft copolymer mixture B-I-a and B-I-b, was added in the form of a dispersion to said mixture, and mixed.

This mixture and the precipitation solution F-IV (electrolyte solution) described below were continuously mixed in the container H1 at a temperature of from 45 to 50° C. The temperature of the graft copolymer mixture here is about 30 to 35° C. and the temperature of the electrolyte solution here is about 60 to 68° C. The following streams were continuously added here to the container H1 and thus mixed:

100 parts by weight per hour of the graft copolymer mixture B-I-a and B-I-b in the form of 35.0% by weight latex
precipitation solution F-IV (electrolyte solution) consisting of a mixture of
45 parts by weight per hour of returned serum fraction S-IV (cf. S1 in FIG. 1);
3.0 parts by weight per hour of an 18% by weight aqueous magnesium sulfate solution and
0.65 part by weight per hour of a 15% by weight aqueous sulfuric acid solution The mixture from container H1 was passed into a second container H2. The temperature in the precipitation container H2 was kept at 94° C. (product temperature of the precipitated graft copolymer dispersion) by feeding steam into the precipitation container H2. The mixture from container H2 was passed into a third container H3.

The temperature in the precipitation container H3 was 92° C. No substances other than the continuous feed from the precipitation container H2 were added to the precipitation container H3.

The volume of the container H1, configured as tube, was 2.0% of the volume of the precipitation container H2; the container H1 was 100% filled. The average residence time $t_1$ in the container H1 was 30 seconds (s). The average residence time in the containers H2 and H3 was respectively 21 minutes; each of the containers was 85% filled.

There was a further container H4 downstream, which comprised a continuously operated circuit with a spiral heat exchanger, with the aid of which the product temperature of the precipitated graft copolymer dispersion was kept at 70° C. The average residence time in the container H4 was 21 minutes.

The containers H2 to H4 had stirrers with which the contents were continuously mixed.

The precipitated graft copolymer was isolated from the serum S by batch centrifuging by a scraper centrifuge at a temperature of 70° C. and with centripetal acceleration $a_z$ 378 g (where g is average acceleration due to gravity) for a period of 32 seconds, thus giving a water-moist graft copolymer B with residual moisture content 22.6% by weight.

The water-moist graft copolymer was dried in a pneumatic dryer. Grain size $D_{50}$ [mm], bulk density [kg/L] and residual moisture content after drying were determined.

Example 1M (not of the Invention)—without Container H1

The precipitation of a mixture of the graft copolymer latices B-I-a and B-I-b (25:75) was carried out in a manner similar to that for example 1L, but without the container H1. The precipitation solution F-IV and the graft copolymer latices were added separately by way of separate lines to the precipitation container H2. All of the other precipitation parameters, for example temperatures, flow rates and residence times, were the same as in example 1L.

The precipitated graft copolymer was substantially isolated from the serum S by batch centrifuging by a scraper centrifuge at a temperature of 70° C. and with centripetal acceleration $a_z$ 567 g (where g is average acceleration due to gravity) for a period of 85 seconds, thus giving a water-moist graft copolymer B with residual moisture content 27.5% by weight. This material was dried as described in example 1L in a pneumatic dryer.

Table 1 collates the experimental conditions, and also the values of grain size $D_{50}$ [mm], the bulk densities [kg/L] and the residual moisture contents after drying and after centrifuging for examples 1A to 1K. The following symbols are used here:

| | |
|---|---|
| V1 | Volume of container H1 in % relative to $V_2$ (volume of container H2) |
| T1 | Temperature in container H1 |
| T2 | Temperature in container H2 |
| T3 | Temperature in container H3 |
| T4 | Temperature in container H4 |
| T5 | Temperature in container H5 |
| $t_1/t_2/t_3/t_4/t_5$ | Average residence times in the containers H1/H2/H3/H4/H5 |
| F-I | Precipitation solution in example 1A |
| F-II | Precipitation solution in example 1F |
| F-III | Precipitation solution in example 1I |
| F-IV | Precipitation solution in example 1L |
| RMC | Residual moisture content in % by weight |
| $D_{50}$ | Grain size $D_{50}$ of graft copolymer B after drying in mm |
| BD | Bulk density of graft copolymer B after drying in kg/L |
| $a_z$ | Centripetal acceleration |
| G | Average acceleration due to gravity |
| $t_c$ | Centrifuging time |
| n.p. | Not present |
| n.d. | Not determinable |

From table 1 it can be seen that examples 1A of the invention with use of a first precipitation container H1 with $T_1$ below 80° C. in the form of a flow tube with a volume of 2% of the volume of the subsequent container H2 (i.e. $V_1=0.02*V_2$) exhibits significantly lower residual moisture content after centrifuging than example 1B without container H1.

Although example 1B not of the invention was centrifuged at higher rotation rate and with longer centrifuging time than example 1A, the graft copolymer 1A exhibits significantly lower residual moisture content.

A particularly low residual moisture content after centrifuging is obtained when the temperature $T_1$ in precipitation container H1 rises and the temperature $T_2$ in the second precipitation container H2 falls, see examples 1C to 1E. A temperature $T_1$ above 90° C. in the first container (example 1G) proved to be disadvantageous.

Comparison of example 1F with example 1A reveals that the result obtained using acetic acid in the precipitation solution is good and comparable with that obtained using sulfuric acid. However, use of sulfuric acid in the precipitation is more advantageous than use of acetic acid, because sulfuric acid gives rise to a significantly lower TOC value in the wastewater, while being equally suitable for the purpose.

If the volume $V_1$ of the first container H1 is selected to be exactly the same as the volume $V_2$ of the subsequent container H2 (example 1H), disadvantageous results are obtained, i.e. it is impossible to carry out the precipitation.

From table 1 it can moreover be seen that the examples 1J and 1K of the invention (precipitation of graft copolymer B-III) have lower residual moisture content after centrifuging and are therefore more amenable to dewatering than the comparable example 1I not of the invention.

From table 1 it can moreover be seen that the example 1L of the invention (precipitation of graft copolymer B-I-a/B-I-b) has lower residual moisture content after centrifuging and is therefore more amenable to dewatering than the comparable example 1M not of the invention.

TABLE 1

Summary of results of examples 1A to 1F

| | | Example | | | | | |
|---|---|---|---|---|---|---|---|
| | | 1A | 1B | 1C | 1D | 1E | 1F |
| | Unit | Of the invention | Comparison | Of the invention | Of the invention | Of the invention | Of the invention |
| $V_1$ | [% relative to $V_2$] | 2 | n.p. | 2 | 2 | 2 | 2 |
| $T_1$ | [° C.] | 45-50 | n.p. | 50-55 | 50-55 | 50-55 | 45-50 |
| $T_2$ | [° C.] | 94 | 94 | 86 | 78 | 70 | 94 |
| $T_3$ | [° C.] | 92 | 92 | 94 | 94 | 94 | 92 |
| $T_4$ | [° C.] | 70 | 70 | 70 | 70 | 70 | 70 |
| $t_1$ | [s] | 30 | n.p. | 30 | 30 | 30 | 30 |
| $t_2/t_3/t_4$ | [min] | 21 | 21 | 21 | 21 | 21 | 21 |
| Graft copolymer | | B-I-a/B-II | B-I-a/B-II | B-I-a/B-II | B-I-a/B-II | B-I-a/B-II | B-I-a/B-II |
| Precipitation solution | | F-I | F-I | F-I | F-I | F-I | F-II |
| $a_z$ | [g] | 511 | 581 | 511 | 511 | 511 | 581 |
| $t_c$ | [s] | 26 | 67 | 26 | 26 | 26 | 33 |
| RMC (after centrifuging) | [% by wt.] | 21.1 | 27.1 | 20.4 | 19.8 | 19.2 | 21.0 |

TABLE 1-continued

| | | | | | | | |
|---|---|---|---|---|---|---|---|
| $D_{50}$ | [mm] | 0.4 | 0.4 | 0.4 | 0.4 | 0.4 | 0.4 |
| BD | [kg/L] | 0.42 | 0.40 | 0.43 | 0.43 | 0.44 | 0.42 |
| RMC (after drying) | [% by wt.] | 0.95 | 0.87 | 0.75 | 0.82 | 0.66 | 0.8 |

Summary of results of examples 1G to 1K

| | | Example | | | | | | |
|---|---|---|---|---|---|---|---|---|
| | | 1G | 1H | 1I | 1J | 1K | 1L | 1M |
| | Unit | | | | | | | |
| | | Comparison | Comparison | Comparison | Of the invention | Of the invention | Of the invention | Comparison |
| $V_1$ | [% relative to $V_2$] | 2 | 100 | n.p. | 0.8 | 0.8 | 2 | n.p. |
| $T_1$ | [° C.] | 94 | 50 | n.p. | 50 | 60 | 45-50 | n.p. |
| $T_2$ | [° C.] | 94 | 94 | 70 | 70 | 70 | 94 | 94 |
| $T_3$ | [° C.] | 92 | 92 | 81 | 81 | 81 | 92 | 92 |
| $T_4$ | [° C.] | 70 | 70 | 82 | 82 | 82 | 70 | 70 |
| $T_5$ | [° C.] | n.p. | n.p. | 70 | 70 | 70 | n.p. | n.p. |
| $t_1$ | [s] | 30 | 21 | n.p. | 9 | 9 | 30 | 30 |
| $t_2/t_3/t_4$ | [min] | 21 | 21 | 15 | 15 | 15 | 21 | 21 |
| Graft copolymer | | B-I-a/B-II | B-I-a/B-II | B-III | B-III | B-III | B-I-a/B-I-b | B-I-a/B-I-b |
| Precipitation solution | | F-I | F-I | F-III | F-III | F-III | F-IV | F-IV |
| $a_z$ | [g] | 511 | n.d. | 707 | 707 | 707 | 378 | 567 |
| $t_c$ | [s] | 26 | n.d. | 46 | 46 | 46 | 32 | 85 |
| RMC (after centrifuging) | [% by wt.] | 21.0 | n.d. | 31.4 | 20.1 | 20.3 | 22.6 | 27.5 |
| $D_{50}$ | [mm] | 0.8 | n.d. | 0.35 | 0.32 | 0.33 | 0.4 | 0.4 |
| BD | [kg/L] | 0.43 | n.d. | 0.37 | 0.41 | 0.40 | 0.37 | 0.29 |
| RMC (after drying) | [% by wt.] | n.d. | n.d. | 0.92 | 0.88 | 0.87 | 0.9 | 0.9 |

Example 2: Production of ABS Molding Compositions and ABS Moldings 2.1 Thermoplastic Copolymer A The thermoplastic copolymer A used was a random styrene/acrylonitrile copolymer A-IV (styrene: acrylonitrile ratio by weight 73:27) with weight-average molar mass $M_w$ 106 000 g/mol and number-average molar mass $M_n$ 15 000 g/mol.

The thermoplastic copolymer A-IV was obtained via free-radical solution polymerization with peroxidic initiation. The content of oligomer with molar mass below 1000 g/mol in the thermoplastic copolymer A-IV was 1.0% by weight. The molar masses $M_w$ and $M_n$ and the oligomer content were determined by gel permeation chromatography with tetrahydrofuran as solvent and polystyrene calibration. Determination of oligomer content in random styrene/acrylonitrile copolymers is moreover described in K. Kirchner, H. Schlapkohl, Makromol. Chem. 177 (1976) 2031-2042, "The formation of oligomers in the thermal copolymerisation of the styrene/acrylonitrile system".

2.2. Linear Polycarbonate K2

Component K2 used was a linear polycarbonate based on bisphenol A with weight-average molar mass $M_w$ 27 500 (determined by gel permeation chromatography in methylene chloride at 25° C.).

2.3 Thermoplastic Molding Compositions 2A to 2F and 2I to 2K

The dried graft copolymer B from examples 1A to 1F and 1I to 1K and the thermoplastic copolymer A-IV were mixed in proportions as in table 2 (data in % by weight) together with 2.0 parts by weight of ethylenebisstearylamide, 0.3 part by weight of magnesium stearate and 0.15 part by weight of a polydimethylsiloxane with viscosity 1000 centistokes at from 200 to 250° C. in a ZSK 25 extruder (manufacturer: Coperion), and after palletization processed to give moldings.

The molding compositions 2A to 2F and 2I to 2K, and moldings produced therefrom, were obtained. The moldings comply with the requirements of the respective test standards.

The following properties were determined on the molding compositions and, respectively, the moldings:

Notched impact resistance at room temperature (ak RT) and at −20° C. (ak-20° C.) in accordance with ISO 180/1A (unit: kJ/m$^2$)

Thermoplastic flowability (MVR (220/10) for 220° C. and 10 kg load in accordance with ISO 1133, unit: cm$^3$/10 min)

Gloss at 20° in accordance with DIN 67530

Yellowness Index in accordance with ASTM method E313-96

Table 2 collates the test results. From the test results it is seen that the molding compositions 2A to 2E and 2I to 2K have comparable mechanical and optical properties. However, the molding compositions 2A, 2C to 2E and 2J and 2K of the invention can be produced at lower cost, because the corresponding graft copolymers are more amenable to dewatering and have lower residual moisture content after centrifuging.

TABLE 2

Composition and test data for molding compositions 2A to 2F

| | | Molding compositions | | | | | |
|---|---|---|---|---|---|---|---|
| | | 2A Of the invention | 2B Comparison | 2C Of the invention | 2D Of the invention | 2E Of the invention | 2F Of the invention |
| Composition | | | | | | | |
| Graft copolymer 1A | [% by wt.] | 34.2 | — | — | — | — | — |
| Graft copolymer 1B | [% by wt.] | — | 34.2 | — | — | — | — |
| Graft copolymer 1C | [% by wt.] | — | — | 34.2 | — | — | — |
| Graft copolymer 1D | [% by wt.] | — | — | — | 34.2 | — | — |
| Graft copolymer 1E | [% by wt.] | — | — | — | — | 34.2 | — |
| Graft copolymer 1F | [% by wt.] | — | — | — | — | — | 34.2 |
| Copolymer A-IV | [% by wt.] | 63.4 | 63.4 | 63.4 | 63.4 | 63.4 | 63.4 |
| Ethylene-bisstearylamide | [% by wt.] | 2.0 | 2.0 | 2.0 | 2.0 | 2.0 | 2.0 |
| Magnesium stearate | [% by wt.] | 0.3 | 0.3 | 0.3 | 0.3 | 0.3 | 0.3 |
| Polydimethylsiloxane | [% by wt.] | 0.1 | 0.1 | 0.1 | 0.1 | 0.1 | 0.1 |
| Test results | | | | | | | |
| Notched impact resistance at room temperature (ak RT) | [kJ/m$^2$] | 21.2 | 21.0 | 21.3 | 21.1 | 21.0 | 21.1 |
| Notched impact resistance at −20° C. (ak −20° C.) | [kJ/m$^2$] | 15.3 | 15.2 | 15.3 | 15.2 | 15.2 | 15.2 |
| MVR (220/10) | [cm$^3$/10 min] | 31.1 | 29.3 | 29.5 | 30.9 | 32.0 | 30.6 |
| Gloss at 20° | | 88.9 | 88.4 | 88.3 | 88.7 | 89.1 | 88.7 |
| Yellowness Index | | 33.5 | 33.7 | 33.9 | 33.5 | 33.5 | 33.6 |

Composition and test data for molding compositions 2I to 2K

| | | Molding compositions | | |
|---|---|---|---|---|
| | | 2I Not of the invention | 2J Of the invention | 2K Of the invention |
| Composition | | | | |
| Graft copolymer 1I | [% by wt.] | 27.3 | — | — |
| Graft copolymer 1J | [% by wt.] | — | 27.3 | — |
| Graft copolymer 1K | [% by wt.] | — | — | 27.3 |
| Copolymer A-IV | [% by wt.] | 70.3 | 70.3 | 70.3 |
| Ethylenebisstearylamide | [% by wt.] | 2.0 | 2.0 | 2.0 |
| Magnesium stearate | [% by wt.] | 0.3 | 0.3 | 0.3 |
| Polydimethylsiloxane | [% by wt.] | 0.1 | 0.1 | 0.1 |
| Test results | | | | |
| Notched impact resistance at room temperature (ak RT) | [kJ/m$^2$] | 21.4 | 21.3 | 21.4 |
| Notched impact resistance at −20° C. (ak −20° C.) | [kJ/m$^2$] | 15.9 | 15.8 | 15.8 |
| MVR (220/10) | [cm$^3$/10 min] | 34.8 | 35.0 | 34.8 |
| Gloss at 20° | | 94.2 | 94.5 | 94.2 |
| Yellowness Index | | 38.5 | 38.2 | 39.0 |

2.4 Thermoplastic Molding Compositions 2L and 2M

The dried graft copolymers B from examples 1L and 1M and the thermoplastic copolymer A-IV were mixed at 260° C. in proportions as in table 3 together with 43 parts by weight of linear polycarbonate K2; 0.75 part by weight of pentaerythritol tetrastearate; 0.12 part by weight of Irganox B900; 0.10 part by weight of Irganox 1076 and 0.02 part by weight of citric acid in a ZSK 25 extruder (manufacturer: Coperion), and after palletization processed to give moldings. This gave the molding compositions 2L and 2M, and moldings produced therefrom. The shape of the moldings complied with the requirements of the respective test.

The following properties were determined on the molding compositions and, respectively, the moldings:
Notched impact resistance at room temperature (ak RT) and at −20° C. (ak-20° C.) in accordance with ISO 180/1A (unit: kJ/m²)
Thermoplastic flowability (MVR (260-5) for 260° C. and 5 kg load in accordance with ISO 1133, unit: cm³/10 min)
Vicat softening point B/120 in accordance with DIN EN ISO 306
Ball indentation hardness (Hc) [N/mm²] EN ISO 2039-1 (test weight 358 N, time 30 s)
Processing stability: The processing stability measure used for the molding compositions produced is the change (in percent) of MVR measured in accordance with ISO 1133 at 260° C. for non-flame-retardant polycarbonate/ABS compositions with RAM load 5 kg and residence time of the melt 15 minutes at a temperature of 300° C. with exclusion of air. The resultant value ΔMVR(proc.) is calculated from the formula:

ΔMVR(proc.)=[(MVR after melt aging−MVR before aging)/MVR before aging]*100%

Table 3 collates the test results.

The molding compositions 2L and 2M have comparable mechanical properties. However, the molding composition 2L of the invention can be produced at lower cost because it is more amenable to dewatering and because the graft copolymer 1L has lower residual moisture content after centrifuging.

TABLE 3

Composition and test data for molding compositions 2L and 2M

| Molding compositions | | 2L Invention | 2M Comparison |
|---|---|---|---|
| Composition | | | |
| Graft copolymer 1L | [pts. by wt.] | 25.25 | — |
| Graft copolymer 1M | [pts. by wt.] | — | 25.25 |
| Copolymer A-IV | [pts. by wt.] | 31.19 | 31.19 |
| Linear polycarbonate K2 | [pts. by wt. | 42.58 | 42.58 |
| Pentaerythritol tetrastearate | [pts. by wt.] | 0.74 | 0.74 |
| IrganoxB900 | [pts. by wt.] | 0.12 | 0.12 |
| Irganox 1076 | [pts. by wt.] | 0.10 | 0.10 |
| Citric acid | [pts. by wt.] | 0.02 | 0.02 |
| Test results | | | |
| Notched impact resistance at room temperature (ak RT) | [kJ/m²] | 43.1 | 43.1 |
| Notched impact resistance at −20° C. (ak −30° C.) | [kJ/m²] | 40.1 | 40.1 |
| MVR (260/10) | [cm³/10 min] | 9.0 | 15.0 |
| Vicat B/120 | [° C.] | 107.4 | 107.2 |
| Ball indentation hardness (Hc) | [N/mm²] | 91.7 | 94.0 |
| ΔMVR(proc.) | [%] | 165 | 283 |

What is claimed is:

1. A process for the production of a graft copolymer composition comprising:
B: from 90 to 100% by weight of at least one graft copolymer B comprising:
B1: from 40 to 85% by weight, based on the graft copolymer B, of at least one graft base B1 which is obtained via emulsion polymerization of:
B11: from 50 to 100% by weight, based on the graft base B1, of butadiene,
B12: from 0 to 50% by weight, based on the graft base B1, of at least one other monomer B12 selected from the group consisting of styrene, α-methylstyrene, acrylonitrile, methacrylonitrile, isoprene, chloroprene, $C_1$-$C_4$-alkylstyrene, $C_1$-$C_8$-alkyl (meth)acrylate, alkylene glycol di(meth)acrylate, and divinylbenzene;
where the entirety of B11+B12 provides precisely 100% by weight; and
B2: from 15 to 60% by weight, based on the graft copolymer B, of a graft shell B2 which is obtained via emulsion polymerization, in the presence of the at least one graft base B1, of:
B21 from 50 to 95% by weight, based on the graft shell B2, of a monomer B21 selected from the group consisting of styrene and mixtures of styrene with at least one other monomer selected from the group consisting of α-methylstyrene, p-methylstyrene, and $C_1$-$C_8$-alkyl (meth)acrylate;
B22 from 5 to 50% by weight, based on the graft shell B2, of a monomer B22 selected from the group consisting of acrylonitrile and mixtures of acrylonitrile with at least one other monomer selected from the group consisting of methacrylonitrile, anhydrides of unsaturated carboxylic, acids and imides of unsaturated carboxylic acids;
where the entirety of graft base B1 and graft shell B2 provides precisely 100% by weight; and
K1: from 0 to 10% by weight of at least one other component K1,
comprising the steps of:
a) production of the graft copolymer B comprising emulsion polymerization of the graft shell B2 in the presence of the at least one graft base 131, where the graft copolymer B is obtained in the form of a latex L;
b) precipitation of the latex L of the at least one graft copolymer B after emulsion polymerization via addition of at least one precipitation solution F comprising at least one salt and/or at least one acid, where a precipitation solution F1 and a portion of the latex L1 are mixed in a first container H1 at a temperature $T_1$ in the range from 30 to 80° C., and the mixture of latex L1 and precipitation solution F1 is passed into at least two further containers H2 and H3 with temperatures $T_2$ and $T_3$ in the range from 60 to 130° C., where optionally further portions of the latex L2 and/or L3 and optionally further precipitation solutions F2 and/or F3 are added,
where the volume $V_1$ of the first container H1 is less than or equal to 30% of the volume $V_2$ of the second container H2;
c) mechanical dewatering of the precipitated graft copolymer B from step b), where an extracted serum S and a graft copolymer B are obtained, where the residual moisture content of the graft copolymer B is less than or equal to 25% by weight; and
d) optionally drying of the dewatered graft copolymer B from step c).

2. The process of claim 1, wherein the process comprises the step of:
d) drying of the dewatered graft copolymer B from step c), where a graft copolymer powder is obtained with residual moisture content less than or equal to 5% by weight.

3. The process of claim 1, wherein the volume $V_1$ of the first container H1 is from 0.1 to 10% of the volume $V_2$ of the second container H2.

4. The process of claim 1, wherein the first container H1 is a flow tube.

5. The process of claim 1, wherein the temperature $T_2$ in container H2 is higher than the temperature $T_1$ in container H1 by at least 10° C.

6. The process of claim 1, wherein the temperature $T_2$ in container H2 is lower than the temperature $T_3$ in container H3 by at least 10° C.

7. The process of claim 1, wherein the temperature $T_1$ in container H1 is in the range from 40 to 60° C., the temperature $T_2$ in container H2 is in the range from 61 to 84° C., and the temperature $T_3$ in container H3 is in the range from 85 to 100° C.

8. The process of claim 1, wherein the precipitation solution F comprises at least one salt selected from the group consisting of magnesium sulfate, calcium chloride, and sodium chloride, and/or at least one inorganic acid.

9. The process of claim 1, wherein the precipitation solution F comprises a portion $S_R$ of the serum S extracted in step c).

10. The process of claim 1, wherein the average residence time $t_1$ of the mixture of latex L and precipitation solution F in container H1 is in the range from 1 to 1000 seconds.

11. The process of claim 1, wherein the average residence time of the mixture of latex L and precipitation solution F in the containers H2 and H3 is respectively in the range from 5 to 60 min.

12. The process of claim 1, wherein the graft copolymer B is a mixture of at least two graft copolymers B-I and B-II, where
- graft copolymer B-I is obtained via emulsion polymerization of a mixture of the monomers B21 and B22 in the presence of a graft base B1-A, the average particle diameter $D_{50}$ of which is in the range from 230 to 330 nm, and of a graft base B1-B, the average particle diameter D50 of which is in the range from 340 to 480 nm;
- and graft copolymer B-II is obtained via emulsion polymerization of a mixture of the monomers B21 and B22 in the presence of a graft base B1-C, the average particle diameter D50 of which is in the range from 10 to 220 nm;
- where the mixture of the graft copolymers B-I and B-II is used in step b) as latex L and is precipitated via the addition of the at least one precipitation solution F.

* * * * *